(12) United States Patent
Schell et al.

(10) Patent No.: US 8,741,433 B2
(45) Date of Patent: Jun. 3, 2014

(54) PACKAGING FILMS COMPRISING NYLON BLEND COMPOSITIONS

(75) Inventors: Thomas Andrew Schell, Winneconne, WI (US); Matt C. Peterka, Oshkosh, WI (US)

(73) Assignee: Curwood, Inc., Oshkosh, WI (US)

( * ) Notice: Subject to any disclaimer, the term of this patent is extended or adjusted under 35 U.S.C. 154(b) by 1294 days.

(21) Appl. No.: 11/791,901

(22) PCT Filed: Dec. 9, 2005

(86) PCT No.: PCT/US2005/044715
§ 371 (c)(1),
(2), (4) Date: May 30, 2007

(87) PCT Pub. No.: WO2006/063283
PCT Pub. Date: Jun. 15, 2006

(65) Prior Publication Data
US 2008/0113130 A1    May 15, 2008

Related U.S. Application Data

(60) Provisional application No. 60/634,853, filed on Dec. 10, 2004.

(51) Int. Cl.
*B32B 27/08* (2006.01)
*B65B 53/02* (2006.01)

(52) U.S. Cl.
USPC ............ 428/411.1; 428/474.4; 428/475.8; 428/34.8; 428/34.9; 264/173.14

(58) Field of Classification Search
USPC ............ 428/411.1, 474.4, 474.6, 34.8, 34.9, 428/475.8; 264/173.14
See application file for complete search history.

(56) References Cited

U.S. PATENT DOCUMENTS

| | | | |
|---|---|---|---|
| 3,456,044 A | 7/1969 | Pahlke | |
| 3,741,253 A | 6/1973 | Brax et al. | |
| 4,044,187 A | 8/1977 | Kremkau | |
| 4,064,296 A | 12/1977 | Bornstein et al. | |
| 4,104,404 A | 8/1978 | Bieler et al. | |
| 4,178,401 A | 12/1979 | Weinberg et al. | |
| 4,348,437 A * | 9/1982 | Lustig et al. | ................. 428/34.9 |
| 4,448,792 A | 5/1984 | Schirmer | |
| 4,469,742 A | 9/1984 | Oberle et al. | |
| 4,534,984 A | 8/1985 | Kuehne | |
| 4,561,920 A | 12/1985 | Foster | |

(Continued)

FOREIGN PATENT DOCUMENTS

| | | |
|---|---|---|
| EP | 0465931 A2 | 1/1992 |
| EP | 0692374 A1 | 1/1996 |

(Continued)

OTHER PUBLICATIONS

Machine translation of JP10-291286, Nov. 1998.*

(Continued)

*Primary Examiner* — Irina S Zemel
(74) *Attorney, Agent, or Firm* — Christine E. Parsons

(57) ABSTRACT

Compositions and packaging films are provided having a blend of an amorphous nylon copolymer, a low temperature polyamide, and a high temperature polyamide. The compositions can be used in making heat shrinkable films and food packages having desirable levels of free shrink.

16 Claims, 2 Drawing Sheets

(56) References Cited

U.S. PATENT DOCUMENTS

| | | |
|---|---|---|
| 4,601,929 A | 7/1986 | Erk et al. |
| 4,704,101 A | 11/1987 | Schirmer |
| 4,724,185 A | 2/1988 | Shah |
| 4,735,855 A | 4/1988 | Wofford et al. |
| 4,737,391 A | 4/1988 | Lustig et al. |
| 4,746,562 A | 5/1988 | Fant |
| 4,753,700 A | 6/1988 | Fant |
| 4,755,402 A | 7/1988 | Oberle |
| 4,755,403 A | 7/1988 | Ferguson |
| 4,755,419 A | 7/1988 | Shah |
| 4,756,421 A * | 7/1988 | Meek .................... 206/524.2 |
| 4,765,857 A | 8/1988 | Ferguson |
| 4,770,731 A | 9/1988 | Ferguson |
| 4,801,486 A | 1/1989 | Quacquarella et al. |
| 4,851,290 A | 7/1989 | Vicik |
| 4,855,178 A | 8/1989 | Langley |
| 4,888,223 A | 12/1989 | Sugimoto et al. |
| 4,909,726 A | 3/1990 | Bekele |
| 4,911,963 A | 3/1990 | Lustig et al. |
| 4,937,112 A | 6/1990 | Schirmer |
| 4,939,076 A | 7/1990 | Mueller |
| 4,963,426 A | 10/1990 | Nishimoto et al. |
| 4,977,022 A | 12/1990 | Mueller |
| 4,997,710 A | 3/1991 | Pockat et al. |
| 5,004,647 A | 4/1991 | Shah |
| 5,020,922 A | 6/1991 | Schirmer |
| 5,037,683 A | 8/1991 | Schirmer |
| 5,053,259 A | 10/1991 | Vicik |
| 5,055,328 A | 10/1991 | Evert et al. |
| 5,079,051 A | 1/1992 | Garland et al. |
| 5,112,696 A | 5/1992 | Roberts |
| 5,288,531 A | 2/1994 | Falla et al. |
| 5,374,459 A | 12/1994 | Mumpower et al. |
| 5,402,625 A | 4/1995 | Halstead |
| 5,447,591 A | 9/1995 | Ennis |
| 5,480,945 A | 1/1996 | Vicik |
| 5,482,770 A | 1/1996 | Bekele |
| 5,482,771 A | 1/1996 | Shah |
| 5,491,009 A | 2/1996 | Bekele |
| RE35,285 E | 6/1996 | Quacquarella et al. |
| 5,534,276 A | 7/1996 | Ennis |
| 5,540,646 A | 7/1996 | Williams et al. |
| 5,545,419 A | 8/1996 | Brady et al. |
| 5,549,943 A | 8/1996 | Vicik |
| 5,562,996 A | 10/1996 | Kuriu et al. |
| 5,591,520 A | 1/1997 | Migliorini et al. |
| 5,595,623 A | 1/1997 | Lulham et al. |
| 5,645,788 A | 7/1997 | Bekele |
| 5,688,456 A | 11/1997 | Kuriu et al. |
| 5,698,279 A | 12/1997 | Vicik |
| 5,741,566 A | 4/1998 | Hogstrom et al. |
| 5,759,648 A | 6/1998 | Idlas |
| 5,763,095 A | 6/1998 | Ramesh et al. |
| 5,866,214 A | 2/1999 | Ramesh |
| 5,910,374 A | 6/1999 | Shah |
| 5,914,164 A | 6/1999 | Ciocca et al. |
| 6,015,235 A | 1/2000 | Kraimer et al. |
| 6,063,417 A | 5/2000 | Paleari et al. |
| 6,068,933 A | 5/2000 | Shepard et al. |
| 6,074,715 A | 6/2000 | Lind et al. |
| 6,106,935 A | 8/2000 | Lambert et al. |
| 6,110,600 A | 8/2000 | Ramesh |
| 6,117,465 A | 9/2000 | Falla |
| 6,117,541 A | 9/2000 | Frisk |
| 6,150,011 A | 11/2000 | Bax et al. |
| 6,194,040 B1 * | 2/2001 | Delius et al. .................. 428/34.8 |
| 6,206,569 B1 | 3/2001 | Kraimer et al. |
| 6,210,765 B1 | 4/2001 | Tanaka et al. |
| 6,211,471 B1 | 4/2001 | Rocke et al. |
| 6,221,410 B1 | 4/2001 | Ramesh et al. |
| 6,221,470 B1 | 4/2001 | Ciocca et al. |
| 6,224,956 B1 | 5/2001 | Shah |
| 6,274,228 B1 | 8/2001 | Ramesh et al. |
| 6,287,613 B1 | 9/2001 | Childress et al. |
| 6,291,041 B1 * | 9/2001 | Howells et al. .............. 428/35.4 |
| 6,299,984 B1 | 10/2001 | Forloni |
| 6,333,061 B1 | 12/2001 | Vadhar |
| 6,346,285 B1 | 2/2002 | Ramesh |
| 6,458,469 B1 | 10/2002 | DeLisio et al. |
| 6,500,559 B2 | 12/2002 | Hofmeister et al. |
| 6,562,443 B1 | 5/2003 | Espinel et al. |
| 6,562,476 B2 | 5/2003 | Shepard et al. |
| 6,579,584 B1 | 6/2003 | Compton |
| 6,579,621 B1 | 6/2003 | Shah |
| 6,599,639 B2 | 7/2003 | Dayrit et al. |
| 6,610,392 B1 | 8/2003 | Ramesh et al. |
| 6,663,905 B1 | 12/2003 | Ennis et al. |
| 6,682,792 B2 | 1/2004 | Schmal et al. |
| 6,699,549 B1 | 3/2004 | Ueyama et al. |
| 6,777,046 B1 | 8/2004 | Tatarka et al. |
| 6,825,276 B2 | 11/2004 | Forte et al. |
| 6,869,686 B1 | 3/2005 | Idlas |
| 6,964,816 B2 | 11/2005 | Schell et al. |
| 6,969,483 B1 | 11/2005 | Woo et al. |
| 7,527,839 B2 | 5/2009 | Busche et al. |
| 2001/0003021 A1 | 6/2001 | Shepard et al. |
| 2001/0010846 A1 | 8/2001 | Hofmeister et al. |
| 2001/0036555 A1 | 11/2001 | Ramesh et al. |
| 2001/0041201 A1 | 11/2001 | Ramesh et al. |
| 2002/0022678 A1 | 2/2002 | Lan et al. |
| 2002/0055006 A1 | 5/2002 | Vogel et al. |
| 2002/0119334 A1 | 8/2002 | Shepard et al. |
| 2003/0017352 A1 | 1/2003 | Dayrit et al. |
| 2003/0026992 A1 | 2/2003 | Anada et al. |
| 2003/0087114 A1 | 5/2003 | Ferri et al. |
| 2003/0165645 A1 * | 9/2003 | Heide et al. .................. 428/34.8 |
| 2004/0048080 A1 | 3/2004 | Schell et al. |
| 2004/0052911 A1 | 3/2004 | Grund et al. |
| 2004/0166262 A1 | 8/2004 | Busche et al. |

FOREIGN PATENT DOCUMENTS

| | | | |
|---|---|---|---|
| JP | 10291286 A | * | 11/1998 |
| WO | 9847704 A1 | | 10/1998 |
| WO | 0037253 A1 | | 6/2000 |
| WO | 02051630 A2 | | 7/2002 |
| WO | 2004/080799 A2 | | 9/2004 |
| WO | 2004080800 A2 | | 9/2004 |
| WO | 2004080804 A2 | | 9/2004 |

OTHER PUBLICATIONS

International Preliminary Report on Patentability for PCT/US2005/044568 issued Jun. 13, 2007 by the International Bureau of WIPO.
International Preliminary Report on Patentability for PCT/US2005/044715 issued Jun. 13, 2007 by the International Bureau of WIPO.

* cited by examiner

PACKAGING FILMS COMPRISING NYLON BLEND COMPOSITIONS

RELATED APPLICATIONS

This application claims the benefit of U.S. provisional application 60/634,853, filed Dec. 10, 2004, entitled "Heat Shrinkable Nylon Blend Films," by Tom Schell, which is incorporated herein by reference in its entirety.

TECHNICAL FIELD

Heat shrinkable single and multilayer films, and food packages comprising the same, are provided herein.

BACKGROUND

Nylon is the generic name for a family of polyamide polymers characterized by the presence of the amide group-CONH. In the food industry, thermoplastic flexible films are used to keep food fresh prior to consumption, or for cooking food products. Greater use of centralized processing of foods in conjunction with increased handling and longer delivery times associated with long distance transportation have increased the demand for packaging films.

In the poultry and meat segments of the food industry thermoplastic flexible films are utilized to maintain freshness. Meat is frequently sold fresh, frozen or cooked; therefore films advantageously provide protection at various temperatures. Food items such as primal and subprimal cuts of beef, ground beef and processed meats are known to use coextruded or laminated films which utilize such compositions as nylon, polyester, copolymer of vinylidene chloride (PVDC), ethylene-vinyl acetate copolymer (EVA) and ionomers.

It is also generally known that selection of films for packaging food products includes consideration of such criteria as barrier properties, cost, durability, puncture resistance, flex-crack resistance, FDA approval, machinability, optical properties such as gloss and haze, printability, sealability, shrinkability, shrink force, stiffness, and strength.

Generally, nylon films are made by processes which include casting or blown film and these films may be uni- or biaxially oriented. Specific types of nylon such as nylon 6, nylon 6,6, and nylon 12 have been made into films. Known advantages of nylon films relative to other film materials in packaging applications include good oxygen and flavor barrier characteristics, durability at low temperatures and thermal stability. Certain nylon films can be used in oriented multilayer films. These multilayer films may also include one or more additional layers of films made of various resins, for example, low density polyethylene (LDPE), ethylene-vinyl acetate copolymer (EVA), ionomer, PVDC, or copolymers of ethylene and methacrylate. Nylon containing films have also been used in vacuum packaging of fresh meat. Typical and generally known films suitable for packaging and information on film manufacture are described in the Encyclopedia of Polymer Science and Engineering 2nd Ed., Vol. 7, pp. 73-127, Vol. 10, pp. 684-695 (John Wiley & Sons, Inc., 1987) whose teachings are hereby incorporated by reference.

Manufacturers and wholesalers use flexible thermoplastic packaging films to provide economical, sanitary containers, which help protect and/or preserve the freshness and wholesomeness of their products. These films are often sold in bag form. For example, a single or multilayer film is made into bags using a tubular film or one or more flat sheets or webs of film by well known processes involving e.g. cutting, folding and/or sealing the film to form bags. These films and bags may be printed and may also be uniaxially or biaxially oriented, heat shrinkable, irradiated, or may contain film layers which are abuse resistant or puncture resistant or which are crosslinked or which enhance or retard or prevent transmission of light, gases, or liquids therethrough.

In many packaging applications, it is desirable that heat shrinkable films also have good heat seal properties. Heat shrinkable bags can be made from heat sealable films. A typical food packaging bag has three sides heat sealed by the bag manufacturer leaving one open side to allow product insertion. For example, a processor may insert fresh, frozen or processed meat, ham, poultry, cheese, primal or subprimal meat cuts, ground beef, fruits, vegetables, bread or other products making a final seal to hermetically enclose the product in the bag. This final seal may follow gas evacuation (i.e. vacuum removal) or replacement of the gaseous environment within the bag by one or more gases to provide some advantage such as to assist product preservation. Food packaging bags can be made by transversely sealing tubular stock of monolayer or multilayer film and cutting off the tube portion containing the sealed end; by making two spaced apart transverse seals on tubular stock and cutting open the side of the tube; by superimposing flat sheets of film and sealing on three sides; or by folding a flat sheet and sealing two sides. This final seal is frequently a heat seal similar to the initial seals produced by the bag manufacturer although the actual heat sealing equipment may vary.

Typically, heat seals are made by applying sufficient heat and pressure to adjacent film layer surfaces for a sufficient time to cause a fusion bond between the plastic film layers. After a product is inserted, the bag is typically evacuated and the bag mouth sealed to enclose the product. Heat sealing techniques are now commonly employed to produce the final closure of the bag. For example, a bag mouth may be either hot bar sealed or impulse sealed. In making a hot bar seal, adjacent thermoplastic layers are held together by opposing bars of which at least one is heated to cause the layers to fusion bond by application of heat and pressure across the area to be sealed. For example, bags may be made from a tube stock by making one hot bar bottom seal transverse to a tubular film. Once the bottom seal is made, the tube stock can be transversely cut to form the mouth of the bag. An impulse seal is made by application of heat and pressure using opposing bars similar to the hot bar seal except that at least one of these bars has a covered wire or ribbon through which electric current is passed for a very brief time period (hence the name "impulse") to cause the adjacent film layers to fusion bond. Following the impulse of heat the bars are typically cooled (e.g. by circulating coolant) while continuing to hold the bag inner surfaces together to achieve adequate sealing strength.

Advantageously, multiple packages comprising heat sealable films may be simultaneously sealed by overlapping packages and applying a sealing means, such as heat or electricity, to the appropriate portions of the packages to provide a sealed enclosed volume therein. Simultaneous sealing of multiple packages can provide advantages such as increased efficiency and throughput. However, if the exterior layer of the overlapping packages is not adequately heat resistant, simultaneous heat sealing can cause overlapping packages to become sealed to each other. Therefore, to allow sealing of overlapping multiple packages, the outermost layer of heat sealable packages and films should be designed to have enough heat resistance to not seal or adhere to another overlapping bag. For example, U.S. Pat. No. 5,480,945 to Vicik discloses nylon resin blends comprising an amorphous nylon copolymer and certain copolyamide polymers. However, the addition of heat resistant materials to allow for overlapping simultaneous sealing of multiple packages may also cause an undesirable reduction in the overall free shrink of the package films. Therefore, there is a need for polymer compositions that can be used to make single or multilayer films useful in forming food packaging having desirable levels of heat resistance with also desirable levels of heat shrink characteristics.

SUMMARY

In a first embodiment, packaging films are provided that comprise a blend of an amorphous nylon copolymer, a low temperature polyamide and a high temperature polyamide. The packaging films can be single layer or multilayer, and preferably have a total free shrink measured at 90° C. of at least 30%, 40% or 50% in at least one of the machine direction or transverse direction. The packaging films preferably have a free shrink of at least 30% at 90° C. in one direction, more preferably at least 30% in two directions, where each direction is either a machine direction or a transverse direction. Even more preferably, the packaging films have a free shrink of at least 40% in a first direction and at least 50% in a second direction. The packaging films are preferably biaxially oriented, heat-shrinkable, or both. Preferably, the films have a total free shrink at 90° C. of at least about 80%. For example, the film can have a free shrink value at 90° C. between about 80% and about 120% at 90° C. In some embodiments, the films can have a total free shrink at 90° C. of at least about 90%, more preferably at least about 95%, still more preferably at least about 100% and even more preferably at least about 105%.

As used herein, a low temperature polyamide preferably has a melting point of less than about 155° C.; a high temperature polyamide preferably has a melting point higher than the low temperature polyamide, and more preferably at least about 155° C. Examples of low temperature polyamide compositions include nylon 6/69 and nylon 6/12 having a melting temperature of less than about 155° C.; examples of high temperature polyamide compositions include nylon 6, nylon 6/66 or nylon 6/12 with a melting temperature of at least about 155° C., or combinations thereof. The amorphous nylon copolymer preferably consists of a nylon polymer or copolymers with no measurable melting point and no heat of fusion, such as nylon 6I/6T, nylon 66/6I/69 copolymer, nylon copolymers of hexamethylene isophthalamide or terephthalamide units and mixtures thereof. More preferably, the heat shrinkable packaging film comprises nylon 6/69 as a low temperature polyamide.

The packaging films can have one or more individual layers that comprise or consist essentially of the following blended composition: an amorphous nylon copolymer, a low temperature polyamide and a high temperature polyamide. The blend compositions can comprise up to about 50% by weight of the amorphous nylon copolymer. Preferably, the blends compositions comprise between about 10% to about 50%, about 10% to about 30%, or about 20% by weight of the amorphous nylon copolymer. The blend compositions can also comprise up to about 50% by weight of the low temperature polyamide. The blend compositions can further comprise up to about 80% by weight of the high temperature polyamide.

In a second embodiment, multilayer heat-shrinkable packaging films are provided that comprise a first layer and a second layer. The first layer can comprise or consist essentially of a blend of an amorphous nylon copolymer, a low temperature polyamide and a high temperature polyamide. The first layer can be positioned at or near the exterior surface of the packaging film, and can be an exterior layer. The second layer is a sealant layer that is preferably positioned at or near the interior surface of the packaging film, and can be an interior layer. The second layer can comprise a suitable heat-sealable polymer such as an ethylene-α-olefin. One or more adhesive layers can be disposed between the first layer and the second layer, and an adhesive layer can contact the first layer and the second layer on opposite sides.

The multilayer packaging films can further comprise an oxygen barrier layer. The oxygen barrier layer can comprise any suitable material, such as EVOH or PVDC, and is preferably positioned between the first and second layers. For example, the oxygen barrier layer can be in contact with the first layer and an adhesive layer.

The multilayer packaging films can optionally further comprise one or more polyamide core layers positioned between an exterior layer and an interior layer. Optionally, additional layers such as adhesive (or "tie") layers can be placed in contact with the polyamide core layer. For example, an adhesive layer can be placed between an exterior layer comprising a three-component nylon blend film of the first embodiment and a polyamide core layer. In packaging films that further comprise an oxygen barrier layer, one or more polyamide core layers are preferably placed in contact with the oxygen barrier layer. Alternatively, one or more other layers can be placed between the oxygen barrier layer and the polyamide core layer. The polyamide core layer can comprise one or more nylon polymers or copolymers, and the composition of the polyamide core layer can be the same or different than the composition of an exterior nylon blend layer or other polyamide core layer. For example, a polyamide core layer can comprise or consist essentially of an amorphous nylon copolymer, a low temperature polyamide, a high temperature polyamide, or any combination thereof.

In a third embodiment, heat-shrinkable food packages are provided that comprise a heat resistant layer and have a total free shrink at 90° C. of at least about 80%. The heat-shrinkable packages can also have a total free shrink measured at 90° C. of about 80% to about 120%, preferably at least about 90%, more preferably at least about 95%, even more preferably at least about 100% and about 105%. The packaging preferably has a free shrink of at least 40% at 90° C. in one direction, more preferably at least 40% in two directions. Even more preferably, the packaging has a free shrink of at least 40% in a first direction and at least 50% in a second direction.

The heat-shrinkable food packages can have any suitable number and configuration of layers. Preferably, the heat-shrinkable food packages can be formed from a multilayer packaging film described with respect to the second embodiment. In some embodiments, the heat-shrinkable food packages can further comprise an oxygen barrier layer preferably positioned between the heat resistant layer and an interior layer. For example, the oxygen barrier layer can be in contact with the heat resistant layer and an adhesive layer.

The heat resistant layer can have any suitable composition, including the composition of the nylon blend packaging films of the first embodiment. Preferably, the heat resistant layer can comprise or consist essentially of a blend of an amorphous nylon copolymer, a low temperature polyamide and a high temperature polyamide. The heat resistant layer is preferably positioned at or near the exterior surface of the packaging film, and can be an exterior layer, but can also form a polyamide core layer described with respect to the second embodiment. The heat-shrinkable food packages preferably include one or more polyamide core layers as described with respect to the second embodiment. Optionally, the heat resistant layer can be oriented in any suitable manner, but is preferably biaxially oriented.

In some embodiments, the heat-shrinkable food package can further comprise a sealant layer positioned at or near the interior surface of the package, for example as an interior layer. A first adhesive layer may also be included between a heat resistant exterior layer and the interior layer. The food packages can further include an oxygen barrier layer positioned between an exterior layer and the interior layer, optionally in contact with the first adhesive layer, the exterior layer or both. In some embodiments, the heat-shrinkable food package can be a cook-in package, preferably when the food package comprises a sealant layer formed from a material that is compatible with cooking conditions.

The compositions, films and packages provided herein are useful to process and/or package articles, especially foodstuffs such as ham, beef, poultry, cheese or processed meat, which may be cooked in a film comprising a composition disclosed herein. Preferably, the food packaging films and packages provided herein are used for packaging various meat or cheese products. Certain embodiments are described in the Detailed Description below.

DETAILED DESCRIPTION OF PREFERRED EMBODIMENTS

Figure 1:
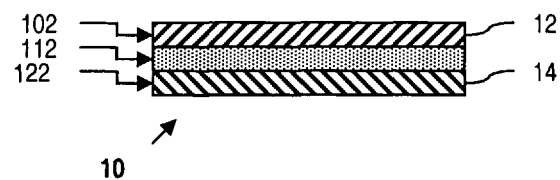
FIG. 1 shows a cross sectional schematic of a first exemplary multilayer film.

In discussing plastic film packaging, various polymer acronyms are used herein and they are listed below. Also, in referring to blends of polymers a colon (:) will be used to indicate that the components to the left and right of the colon are blended. In referring to film structure, a slash "/" will be used to indicate that components to the left and right of the slash are in different layers and the relative position of components in layers may be so indicated by use of the slash to indicate film layer boundaries. Acronyms commonly employed herein include:

EAA—Copolymer of ethylene with acrylic acid
EVA—Copolymer of ethylene with vinyl acetate
EVOH—A saponified or hydrolyzed copolymer of ethylene and vinyl acetate
MA Saran—methyl acrylate and vinylidene chloride
PE—Polyethylene (an ethylene homopolymer and/or copolymer of a major portion of ethylene with one or more α-olefins)
PP—Polypropylene homopolymer or copolymer
PVDC—Polyvinylidene chloride (also includes copolymers of vinylidene chloride, especially with vinyl chloride), also referred to as Saran A "core layer," as used herein, refers to a layer positioned between and in contact with at least two other layers.

An "outer layer," as used herein, refers to a layer forming at least a portion of an exterior or interior surface. The outer layer can be an interior layer or an exterior layer. In a multilayer film, an outer layer can contact another layer. In a single-layer film, the layer itself can be an outer layer that is both an exterior layer and an interior layer.

The term "exterior layer" refers to a layer comprising the outermost surface of a film or product. For example, an exterior layer can form the exterior surface of a package that contacts the exterior layer of another package during overlapping heat sealing of two packages.

The term "interior layer" refers to a layer comprising the innermost surface of a film or product. For example, an interior layer forms the interior surface of an enclosed package. The interior layer can be the food-contact layer and/or the sealant layer.

As used herein, the term "barrier", and the phrase "barrier layer", as applied to films and/or film layers, are used with reference to the ability of a film or film layer to serve as a barrier to one or more gases or moisture.

The term "adhesive layer," or "tie layer," refers to a layer or material placed on one or more layers to promote the adhesion of that layer to another surface. Preferably, adhesive layers are positioned between two layers of a multilayer film to maintain the two layers in position relative to each other. Unless otherwise indicated, an adhesive layer can have any suitable composition that provides a desired level of adhesion with the one or more surfaces in contact with the adhesive layer material. Typically, an adhesive layer placed between a first layer and a second layer in a multilayer film can comprise components of both the first layer and the second layer to promote simultaneous adhesion of the adhesive layer to both the first layer and the second layer to opposite sides of the adhesive layer.

As used herein, the phrases "seal layer," "sealing layer," "heat seal layer," and "sealant layer," refer to an outer film layer, or layers, involved in the sealing of the film to itself, another film layer of the same or another film, and/or another article which is not a film. In general, the sealant layer is an interior layer of any suitable thickness, that provides for the sealing of the film to itself or another layer. With respect to packages having only fin-type seals, as opposed to lap-type seals, the phrase "sealant layer" generally refers to the interior surface film layer of a package, as well as supporting layers of the interior surface of the sealant layer. The inside layer frequently also serves as a food contact layer in the packaging of foods. In general, sealant layers employed in the packaging art have included thermoplastic polymers, such as polyolefin (e.g., linear low density polyethylene, very low density polyethylene, homogeneous polymers such as metallocene catalyzed ethylene/alpha-olefin copolymer, etc.), polypropylene homopolymers and copolymers, polyamide, polyester (e.g., polyethylene terephthalate glycol), ethylene/ester copolymer (e.g., ethylene/vinyl acetate copolymer), ionomer, and functional equivalents thereof. More specifically, the sealant layer may comprise one or more materials selected from thermoplastic resins inclusive of: polyolefins polymerized by using a single-site catalyst or metallocene catalyst (sometimes abbreviated as "SSC") inclusive of linear low-density polyethylene (abbreviated as "SSC-LLDPE") and very low-density polyethylene (abbreviated as "SSC-VLDPE"); conventional types of ethylene-α-olefin copolymers inclusive of "LLDPE" and "VLDPE" in terms of generally accepted abbreviations; ethylene-vinyl acetate copolymer (abbreviated as "EVA"), ethylene-methacrylic acid copolymer (abbreviated as "EMAA"), ethylene-methacrylic acid-unsaturated aliphatic carboxylic acid copolymer, low-density polyethylene, ionomer resin (abbreviated as "IO (resin)"), ethylene-acrylic acid copolymer, ethylene-methyl acrylate copolymer (abbreviated as "EMA"), and ethylene-butyl acrylate copolymer (abbreviated "EBA"). Such a preferred class of sealable resins may be termed as an ethylene copolymer, typically a copolymer of a major amount (i.e., more than 50 wt. %) of ethylene with a minor amount (i.e., less than 50 wt. %, preferably up to 30 wt. %) of a vinyl monomer copolymerizable with ethylene selected from the group consisting of α-olefins having 3 to 8 carbon atoms, and unsaturated carboxylic acids and unsaturated esters of carboxylic acids having up to 8 carbon atoms, inclusive of acrylic acid, methacrylic acid, acrylate esters, methacrylate esters and vinyl acetate, or an acid-modified product of the ethylene copolymer (preferably modified with up to 3 wt. % of an unsaturated carboxylic acid). It is also possible to use a thermoplastic resin, such as thermoplastic resin, such as polypropylene resin, polyester resin or aliphatic nylon. The sealable resin may preferably have a melting point of up to about 150° C., more preferably up to about 135° C. It is also possible to use a blend including at least one species of such a sealable resin within an extent of not impairing the transparency of the resultant film or a sealed product thereof.

The term "polyamide" means a polymer having amide linkages, and as used herein it refers more specifically to synthetic polyamides, either aliphatic or aromatic, either in crystalline or amorphous form. It is intended to refer to both polyamides and co-polyamides. Polyamides are preferably selected from nylon compounds approved for use in producing articles intended for use in processing, handling, and packaging food, including homopolymers, copolymers and mixtures of the nylon materials described in 21 C.F.R. 177.1500 et seq., which is incorporated herein by reference. Exemplary of such polyamides include nylon homopolymers and copolymers such as those selected form the group consisting of nylon 4,6 (poly(tetramethylene adipamide)), nylon 6 (polycaprolactam), nylon 6,6 (poly(hexamethylene adipamide)), nylon 6,9 (poly(hexamethylene nonanediamide)), nylon 6,10 (poly(hexamethylene sebacamide)), nylon 6,12 (poly(hexamethylene dodecanediamide)), nylon 6/12 (poly (caprolactam-co-dodecanediamide)), nylon 6,6/6 (poly(hexamethylene adipamide-co-caprolactam)), nylon 66/610 (e.g., manufactured by the condensation of mixtures of nylon 66 salts and nylon 610 salts), nylon 6/69 resins (e.g., manufactured by the condensation of epsilon-caprolactam, hexamethylenediamine and azelaic acid), nylon 11 (polyundecanolactam), nylon 12 (polyauryllactam) and copolymers or mixtures thereof.

A "high temperature polyamide" is a polyamide with a melting temperature (DSC) of at least 155° C.

A "low temperature polyamide" is a polyamide with a melting temperature (DSC) of 155° C. or less.

As used herein, "EVOH" refers to ethylene vinyl alcohol copolymer. EVOH includes saponified or hydrolyzed ethylene vinyl acetate copolymers, and refers to a vinyl alcohol copolymer having an ethylene comonomer, and prepared by, for example, hydrolysis of vinyl acetate copolymers, or by chemical reactions with polyvinyl alcohol. The degree of hydrolysis is preferably from about 50 to 100 mole percent, more preferably, from about 85 to 100 mole percent.

As used herein, terms identifying polymers, such as "polyamide", are inclusive of not only polymers comprising repeating units derived from monomers known to polymerize to form a polymer of the named type, but are also inclusive of comonomers, derivatives, copolymers which can copolymerize with monomers known to polymerize to produce the named polymer, as well as modified polymers made by derivitization of a polymer after its polymerization. The term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide. Furthermore, terms identifying polymers are also inclusive of "blends" of such polymers with other polymers of a different type. The terms "polyamide polymer" and "nylon polymer" refer to a polyamide-containing polymer, a polyamide-containing copolymer or mixtures thereof.

As used herein, the phrase "machine direction", herein abbreviated "MD", refers to a direction "along the length" of the film, i.e., in the direction of the film as the film is formed during extrusion and/or coating. As used herein, the phrase "transverse direction", herein abbreviated "TD", refers to a direction across the film, perpendicular to the machine or longitudinal direction.

Shrinkage values are defined to be values obtained by measuring unrestrained shrink of a 10 cm square sample immersed in water at 90-C (or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath. The specimen is then removed from the bath and the distance between the ends of the shrunken specimen is measured for both the machine direction (M.D.) and transverse direction (T.D.). The difference in the measured distance for the shrunken specimen and the original 10 cm. side is multiplied by ten to obtain the percent of shrinkage for the specimen in each direction. The shrinkage of four specimens is averaged for the M.D. shrinkage value of the given film sample, and the shrinkage for the four specimens is averaged for the TD shrinkage value. As used herein the term "heat shrinkable film at 90° C. means a film having an unrestrained shrinkage value of at least 10% in at least one direction. The term "total free shrink" refers to the sum of the stretch in the M.D. and T.D. directions.

In use of the term "amorphous nylon copolymer," the term "amorphous" as used herein denotes an absence of a regular three-dimensional arrangement of molecules or subunits of molecules extending over distances which are large relative to atomic dimensions. However, regularity of structure may exist on a local scale. See, "Amorphous Polymers," Encyclopedia of Polymer Science and Engineering, 2nd Ed., pp. 789-842 (J. Wiley & Sons, Inc. 1985). In particular, the term "amorphous nylon copolymer" refers to a material recognized by one skilled in the art of differential scanning calorimetry (DSC) as having no measurable melting point (less than 0.5 cal/g) or no heat of fusion as measured by DSC using ASTM 3417-83. The amorphous nylon copolymer may be manufactured by the condensation of hexamethylenediamine, terephthalic acid, and isophthalic acid according to known processes.

A suitable method of determining a melting point is by using differential scanning calorimetry (DSC) to determine the heat of fusion. Preferred high temperature polyamides melt at temperatures within a range of from about 155° C. to about 215° C. Polyamides with melting points in this range have been found to form useful blends with amorphous nylon copolymers, which blends are easy to process into films including oriented films. In film packaging applications, low temperature polyamides with melting points less than 155° C.

soften and distort at typical processing temperatures which include e.g. 82°-93° C. (180°-200° F.) for shrink wrapping and 71°-82° C. (160°-180° F.) for cooking sausages. The terms "high temperature polyamide" and "low temperature polyamide" include mixtures of copolyamides as well.

Nylon resins are well known polymers having a multitude of uses including utility as packaging films, bags and casing. See, e.g. Modern Plastics Encyclopedia, 88 Vol. 64, No. 10A, pp 34-37 and 554-555 (McGraw-Hill, Inc., 1987) which is hereby incorporated by reference. In particular, the novel blends, thermoplastic flexible films, and oriented multilayer films are useful in food packaging.

Nylon Blend Compositions

In a first embodiment, packaging films are provided that comprise a nylon blend composition having at least three nylon components: an amorphous nylon, a low temperature polyamide and a high temperature polyamide. The packaging films can be single layer or multilayer.

The nylon blend composition forming at least a portion of a packaging film can be described by the weight percent of each of the nylon components with respect to the total weight of all of the nylon components of the nylon blend in a single layer. For example, if a layer comprised a nylon blend consisting of an amorphous nylon copolymer, a low temperature polyamide and a high temperature polyamide, then the weight percent of each nylon blend component is expressed as a weight percent of the total weight of the nylon blend (amorphous nylon, low temperature polyamide and high temperature polyamide), even if other materials are included in the layer or multiple nylon polymers are included for each component of the nylon blend. Other materials may be added to the nylon blend composition or to layers comprising the nylon blend composition, including non-polyamide components. However, unless otherwise specified, the weight percent of the amorphous nylon copolymer, the low temperature polyamide and the high temperature polyamide in the nylon blend composition are expressed as a weight percentage of the total of only the total amount of the total of these three components in a single film layer.

In some embodiments, a film or film layer comprises a nylon blend composition having a blend of three components: an amorphous nylon such as Nylon 6I/6T in an amount of between about 5 and 50 weight percent of the three components of the nylon blend; a low temperature polyamide such as Nylon 6/69 copolymer, having a melting point of less than about 155° C. in an amount between about 5 and about 60 weight percent of the three components of the nylon blend; and a high temperature polyamide such as Nylon 6 having a melting point of at least about 155° C. in an amount between about 5 and about 90 weight percent of the three components of the nylon blend. The nylon blend compositions can preferably further comprise up to about 80%, preferably between about 20% to about 80%, more preferably between about 30% to about 70%, or even more preferably about 60% by weight of the high temperature polyamide. The packaging films can have individual layers that comprise or consist essentially of a nylon blend composition. Any suitable polyamide polymers for the high temperature polyamide, the low temperature polyamide or the amorphous nylon compositions. Preferred polymers are those approved for food contact by the United States Food and Drug Administration, including polymers disclosed at 52 Fed. Reg. 26, 666-26,667, Jul. 16, 1987, which is incorporated herein by reference.

Preferably, packaging films comprise one or more layers that include about 5, 10, 15, 20, 25, 30, 35, 40, 45, or 50 weight percent of the amorphous nylon copolymer with respect to the amount of nylon blend composition in the layer, or any increment of 1 or 0.1 weight percent therebetween. More preferably, packaging films comprise from about 10 to about 50 weight percent of the amorphous nylon copolymer, about 10 to about 30 weight percent of the amorphous nylon copolymer, or between about 15 and about 25 weight percent of the amorphous nylon copolymer, including increments of 1% or 0.1% therebetween, and preferably about 20% by weight of the amorphous nylon polymer, or any combination thereof. Any suitable amorphous nylon polymer or copolymer can be used. Amorphous nylon polymers can be manufactured, for example, by the condensation of dexamethylenediamine, terephthalic acid and isophthalic acid. Suitable amorphous nylon copolymers include hexamethylene isophthalamide-hexamethylene terephthalamide copolymer also referred to as nylon 6I/6T. Amorphous nylon copolymers such as nylon 66/6I/6T can also be used as the amorpohous nylon component. A preferred component is hexamethyleneisothalamide-hexamethylene terephathalamide copolymer which has from about 65 percent to about 80 percent of its polymer units derived from hexamethyleneisophthalamide. Especially preferred as the amorphous nylon copolymer component is a commercially available nylon 6I/6T sold by the DuPont Company of Wilmington, Del., U.S.A. under the trademarked designation Selar PA 3426. Selar PA 3426 is further characterized by DuPont Company technical bulletin E-73974 dated 12/85, which is hereby incorporated by reference, as an amorphous nylon (polyamide) having superior transparency, good barrier properties to gases such as $O_2$, solvents and essential oils and also the following properties according to the indicated standards: density of 1.19 gm/cc (ASTM D1505): glass transition temperature of 127° C. (ASTM D3418): heat deflection temperature of 126° C. at 4.6 $Kg/cm^2$ (66 psi) and 123° C. at 18.4 $Kg/cm^2$ (264 psi) (ASTM D648), and flexural modulus of 27,900 $Kg/cm^2$ (400,000 psi) at 50 percent relative humidity and 23° C. (ASTM D790). Another preferred amorphous nylon is a nylon 6I/6T sold under the tradename GRIVORY G21 from Emser Industries of Sumter, S.C., a division of EMS-American Grilon, Inc. (EMS). Nylon 6I/6T resins (CAS Reg. No. 25750-23-6) can be manufactured, for example, by the condensation of hexamethylenediamine, terephthalic acid, and isophthalic acid such that 65 to 80 percent of the polymer units are derived from hexamethylene isophthalamide.

A nylon blend composition can also include a low temperature polyamide having a melting point of up to 155° C. Preferably, nylon blend compositions can include about 5, 10, 15, 20, 25, 30, 35, 40, 45, 50, 55 or 60 weight percent of the low temperature polyamide with respect to the amount of nylon blend composition in the layer, or any increment of 1 or 0.1 weight percent therebetween. Preferably, packaging films comprise from about 5 to about 60 weight percent, from about 10 to about 50 weight percent, from about 10 to about 30 weight percent, or between about 20 and about 40 weight percent, and preferably about 20 weight percent of the low temperature polyamide. Most preferably, the low temperature polyamide is nylon 6/69, although other low temperature polyamides can be used. Low temperature polyamides include polyamide polymers and copolymers with melting points below about 145° C. A preferred low temperature polyamide with a melting point less than 155° C. is a nylon 6/69 copolyamide which melts at about 134° C. (DSC max.), which is commercially available from EMS-CHEMIE (North America) Inc. under the trademark Grilon BM13SBG.

A heat-shrinkable nylon blend composition can also include a high temperature polyamide with a melting point higher than the low temperature polyamide, and preferably 155° C. or higher. For example, high temperature polyamides can have melting points between about 155° C. and about 220° C. or higher. Preferred high temperature polyamides include nylon 6, certain nylon 6/12 compositions, nylon 6/66 and mixtures thereof. Most preferably, the high temperature polyamide is nylon 6. Suitable high temperature polyamides include commercially available nylon 6/12, nylon 6, and nylon 6/66 copolyamides. A preferred nylon 6 with a melting point of about 215-220° C. is sold under the tradename ULTRAMID B36, from BASF. An example of a suitable nylon 6/12 copolyamide which melts within a range of from about 195°-200° C. (ASTM D2117) is commercially available under the trademark Grilon CR 9 from Emser Industries of Sumter, S.C., a division of EMS-American Grilon, Inc. (EMS). A preferred nylon is a nylon 6/66 copolymer having a melting point of about 195° C., which has a reported nylon 6 component content of about 85 mole % and a nylon 66 component content of about 15 mole % and which is commercially available from Allied Signal of Morristown, N.J., U.S.A. under the trademark CAPRON XTRAFORM™ 1539F. Another preferred nylon is a nylon 6/66 copolymer sold under the designation C33 and produced by BASF under the trade name ULTRAMID®. A preferred nylon 6 having a melting point of about 220° C. is commercially available from Bayer AG under the trademark DRETHAN® B40F, or from Honeywell under the trademark CAPRON™ H135ZP. The nylon blend composition can comprise about 5, 10, 15, 20, 25, 30, 35, 40, 45, 50, 55, 60, 65, 70, 75, 80, 85 or 90 weight percent of the high temperature polyamide with respect to the amount of nylon blend composition in the layer, or any increment of 1 or 0.1 weight percent therebetween. Outer heat resistant layers of packaging films, for example, can preferably comprise about 5 to about 90 weight percent, about 10 to about 80 weight percent, about 20 to about 70 weight percent, or about 30 to about 75 weight percent, and preferably about 50 to about 60 weight percent of the high temperature polyamide. Core heat resistant layers of packaging films comprise about 5 to about 90 weight percent, about 10 to about 80 weight percent, about 20 to about 70 weight percent, or about 30 to about 75 weight percent, and preferably about 30 to about 40 weight percent of the high temperature polyamide.

Other nylon polymer components can also be selected as amorphous nylon copolymers, low temperature or high temperature polyamides based on their physical characteristics and structure. Preferably, polymers are selected from compositions approved as safe for producing articles intended for use in processing, handling and packaging of food. For example, nylon resins approved by the Food and Drug Administration are provided at 21 CFR §177.1500 ("Nylon resins"), which is incorporated herein by reference. Examples of these nylon resins for use in food packaging and processing include: nylon 66, nylon 610, nylon 66/610, nylon 6/66, nylon 11, nylon 6, nylon 66T, nylon 612, nylon 12, nylon 6/12, nylon 6/69, nylon 46, nylon PA 6-3-T, nylon MXD-6, nylon 12T and nylon 6I/6T disclosed at 21 CFR §177.1500. Amorphous nylon compositions, low temperature polyamides and high temperature polyamides can be selected from these compounds based on their chemical polymer structure and physical properties such as melting point.

In some embodiments, the nylon blend composition consists essentially of the amorphous nylon copolymer, the low temperature polyamide and the high temperature polyamide.

Alternatively, mixtures of copolyamides may be usefully employed as polyamide compositions. For example, two or more copolyamides each having a melting point of at least 155° C. may be used as a high temperature polyamide, or a copolyamide having a melting point of at least 155° C. may be mixed with one or more other copolyamides which have melting points less than 155° C. or are amorphous themselves.

Various ratios of the weight percent of the low temperature polyamide to that of the amorphous nylon copolymer in the blend can be used, including ratios between 4:1 to 1:4. Preferably, the ratio is between about 2:1 and 1:2. More preferably, the ratio is about 1:1. Ratios of 4:1, 3.5:1, 3:1, 2.5:1, 1:2.5, 3:1, 3.5:1, and 1:4, as well as ratio intervals of 0.1 therebetween, are also provided.

A film comprising a nylon blend composition can have any total thickness desired, so long as the film provides the desired properties for the particular packaging operation in which the film is used. Preferably, the film has a total thickness of less than about 20 mils, more preferably the film has a total thickness of from about 1 to 20 mils, still more preferably from about 2 to 10 mils, and yet still more preferably, from about 1.5 to 6 mils. For example, entire single or multilayer films or any single layer of a multilayer films can have any suitable thicknesses, including 1, 2, 3, 4, 5, 6, 7, 8, 9, or 10 mils, or any increment of 0.1 or 0.01 mil therebetween. Thicker and thinner films are also provided. Packaging films preferably have a thickness of about 1.5-3 mils (50.8-76.2 microns), although suitable films for packaging foodstuffs as thick as 4 mils (101.6 microns) or as thin as 1 mil (25.4 microns) may be made. Typically, films will be between about 1.5-3 mil (38.1-76.2 microns). Especially preferred for use as films for food packaging are films where the multilayer film has a thickness of between about 2 to 3 mils (50.8-76.2 microns). Such films have good abuse resistance and machinability. Preferred films are heat shrinkable and have a desirable level of total heat shrinkage measured at 90° C. Preferred films may also provide a beneficial combination of one or more or all of the properties including low haze, high gloss, high shrinkage values at 90° C. or less, good machinability, good mechanical strength and good barrier properties including high barriers to oxygen and water permeability.

Preferably, a packaging film or film layer comprising a nylon blend composition has a total free shrink of at least about 80%, 85%, 90%, 95%, 100%, 105%, 110%, 115%, 120%, 125%, 130%, 135%, or 140% measured at 90° C., or between about 80% and about 120% at 90° C., including about 90%, about 95%, about 100% and about 105%. Preferably, a packaging film has a free shrink value at 90° C. of at least 30% in at least one of the machine direction or transverse direction. The packaging films preferably have a free shrink of at least 40% at 90° C. in the machine direction, the transverse direction, or in both the machine direction and the transverse direction. Preferably, the packaging films have a free shrink in the machine direction of about 30%. 35%, 40%, 45%, 50%, 55%, 60%, 65% or 70% or greater, including any increment of 1%, 0.5% or 0.25% therebetween, measured at 90° C. Preferably, a packaging film has a free shrink in the transverse direction of about 30%. 35%, 40%, 45%, 50%, 55%, 60%, 65% or 70% or greater, including any increment of 1%, 0.5% or 0.25% therebetween, measured at 90° C. More preferably packaging films have a free shrink of at least 40% in two directions. Even more preferably, the packaging films have a free shrink of at least 40% in a first direction that is the machine direction and at least 50% in a second direction that is the transverse direction.

Multilayer Packaging Films

In a second embodiment, multilayer packaging films are provided that comprise a first layer and a second layer positioned in any suitable configuration. The first layer is preferably a heat-resistant layer; the second layer is preferably a sealant layer. The multilayer packaging films can be heat-shrinkable films, and can have any suitable configuration of the first layer and the second layer. For example, the first layer can be positioned as an exterior layer, or as a core layer, and the second layer is preferably positioned as an interior layer. In some aspects, the multilayer packaging film can further include one or more additional layers positioned between the first layer and the second layer.

The first layer preferably provides a desired level of heat resistance. When forming an exterior layer, the first layer is preferably adequately heat resistant to prevent simultaneous heat sealing between overlapping packages during heat sealing processes. The first layer can comprise or consist essentially of a nylon blend composition. Preferably, the nylon blend composition comprises at least an amorphous nylon copolymer, a low temperature polyamide and a high temperature polyamide, such as the nylon blend compositions described with respect to the first embodiment. Multilayer films having any suitable combination of a heat resistant layer comprising various nylon blends and one or more layers selected from the group consisting of: core polyamide layers, adhesive layers, tie layers, bulk layers, sealant layers and oxygen barrier layers.

The second layer is preferably formulated and positioned to form a heat seal. The second layer is preferably a sealant layer positioned at or near the interior surface of the package, for example as an interior layer. Preferably, the sealant layer is an interior surface heat sealing layer which allows a multilayer film to be formed into bags. The terms "heat sealing layer" or "sealant layer" are used interchangeably to refer to a layer which is heat sealable to itself, i.e., capable of fusion bonding by conventional indirect heating means which generate sufficient heat on at least one film contact surface for conduction to the contiguous film contact surface and formation of a bond interface therebetween without loss of the film integrity. Advantageously, the bond interface is preferably sufficiently thermally stable to prevent gas or liquid leakage therethrough when exposed to above or below ambient temperatures during processing of food within the tube when sealed at both ends, i.e., in a sealed bag form. For use in cook-in applications the heat seals should withstand elevated temperatures up to about 160-180° F. (71-82° C.) or higher for extended periods of time e.g. up to 4 to 12 hours in environments which may range from heated humidified air or steam to submersion in heated water. Finally, the bond interface between contiguous inner layers preferably has sufficient physical strength to withstand the tension resulting from stretching or shrinking due to the presence of a food body sealed within the tube and optionally subjected to pasteurization or cook-in temperatures and conditions. A sealant layer preferably comprises a heat sealable polymeric material such as polypropylene homopolymers, polypropylene copolymers, very low density polyethylene (VLDPE), ultra low density polyethylene (ULDPE), linear low density polyethylene (LLDPE) or homogeneous polyolefin resins, such as made with metallocene single-site catalysts. Ethylene vinyl acetate (EVA) copolymers are also suitable materials for forming the inner surface heat sealable layer. A sealant layer preferably comprises an ionomer such as Surlyn®, available from DuPont Company. This material is essentially a metal salt neutralized copolymer of ethylene and acrylic or methacrylic acid. Other suitable sealant materials include metallocene catalyzed polyolefins, polyolefins, ethylene-alpha olefin copolymers, and blends thereof. Sealant layer can be 5 to 50% of the thickness of the total structure with a preferred thickness being about 15% of the total thickness.

In addition to the first layer and the second layer, a multilayer heat shrinkable packaging film can further comprise one or more adhesive layers, also known in the art as "tie layers," which can be selected to promote the adherence of adjacent layers to one another in a multilayer film. The adhesive layer is preferably formulated to aid in the adherence of one layer to another layer without the need of using adhesives by virtue of the compatibility of the materials in that layer to the first and second layers. In some embodiments, adhesive layers comprise materials found in both the first and second layers. The adhesive layer is preferably between 2% and 10% of the overall thickness of the multilayer film, preferably 3%. In one aspect of the second embodiment, a multilayer film comprises a three layer structure with an adhesive layer positioned between and in contact with the first layer and the second layer. In another aspect, a multilayer film comprises a multilayer structure comprising a first adhesive layer positioned between the first layer and the second layer and in contact with the first layer and a fourth layer also positioned between the first layer and the second layer. Multilayer films can comprise any suitable number of adhesive layers of any suitable composition. Various adhesive layers typically have different compositions from each other, and are formulated and positioned to provide a desired level of adhesion between layers of the film.

Some embodiments provide a three-layer coextruded film with desirable levels of both heat resistance and heat shrinkability in a multilayer film structure. Referring specifically to FIG. 1, an example of a three-layer film structure, generally designated at reference numeral 10, is directed to a multilayer composite comprising an outer layer 12 that is a heat resistant layer 102 comprising a nylon blend composition, and an outer layer 14 that is a sealant layer 122, each joined to opposite sides of a core adhesive layer 112. The multilayer film 10 is designed to be used in the packaging of food products and can be used as both forming and non-forming film. Preferably, the heat resistant layer 102 comprises a heat shrinkable nylon blend composition comprising an amorphous nylon copolymer, a low temperature polyamide and a high temperature polyamide.

The multilayer packaging films can further comprise a barrier layer, which is preferably a gas barrier layer. The gas barrier layer is preferably an oxygen barrier layer, and is preferably a core layer positioned between the first and second layers. For example, the oxygen barrier layer can be in contact with the first layer and an adhesive layer. In some embodiments, the film, bag, process and package provided herein comprise heat sealable, oxygen or moisture barrier films for holding a foodstuff during cooking and/or for packaging for sale of such a foodstuff after a pasteurization or cooking period.

The barrier layer can comprise any suitable material, such as EVOH or PVDC. The barrier layer can provide a suitable barrier to oxygen for preservation of the article to be packaged. The barrier layer preferably also provides desirable optical properties when stretch oriented, including low haze and a stretching behavior compatible with the layers around it. It is desirable that the thickness of the barrier layer be selected to provide the desired combination of the performance properties sought e.g. with respect to oxygen permeability, shrinkage values especially at low temperatures, ease of orientation, delamination resistance, and optical properties. Suitable thicknesses are less than 15%, e.g. from 3 to 13% of the total film thickness. Preferably, the thickness of the core layer will also be less than about 10% of the total thickness of the multilayer film. For example, the thickness of a core oxygen barrier layer can be less than about 0.45 mil (10.16 microns) and greater than about 0.05 mil (1.27 microns), including 0.10, 0.20, 0.25, 0.30, 0.40, or 0.45 mil thick.

Preferably, multilayer films include a core oxygen barrier layer. Any suitable material can be used to form an oxygen barrier layer. The oxygen barrier layer of a film preferably comprises EVOH, although oxygen barrier layers comprising polyvinylidene chloride—vinyl chloride copolymer (PVDC or VDC-VC) or vinylidene chloride—methylacrylate copolymer (VDC-MA, or MA-Saran) can also be used. Combinations of EVOH and PVDC, or blends of these and other materials can also be used to form an oxygen barrier layer.

When an EVOH material is used as an oxygen barrier layer, an oxygen barrier layer can comprise a hydrolyzed ethylene/vinyl acetate copolymer (designated by the abbreviations "EVOH" and "HEVA", and also referred to as "ethylene/vinyl alcohol copolymer"), polyvinylidene chloride, polyamide, polyester, polyalkylene carbonate, polyacrylonitrile, etc., as known to those of skill in the art. One preferred EVOH barrier material is a 44% mol EVOH resin E151 B sold by Eval Company of America, under the trade name Eval® LC-E151 B. Another example of an EVOH that may be acceptable can be purchased from Nippon Gohsei under the trade name Soarnol® AT (44 mol % ethylene EVOH).

When a PVDC oxygen barrier material is used as an oxygen barrier layer, a core layer comprises MA-Saran to control the oxygen permeability of the film. For perishable food packaging, the oxygen ($O_2$) permeability desirably should be minimized.

Typical oxygen barrier films will have an $O_2$ permeability of less than about 20 $cm^3/m^2$ for a 24 hour period at 1 atmosphere, 0% relative humidity and 23° C., and preferably less than 15 $cm^3/m^2$, more preferably less than 10 $cm^3/m^2$. The amount of MA-Saran in the core layer may be adjusted by blending in compatible polymers to vary orientation parameters or the gas permeability e.g. $O_2$ of the films. The thickness of the core layer may also be varied from about 0.05 to about 0.30 mils (1.3-7.62 microns). Also, while it is preferred that the core layer consist essentially of MA-Saran, up to 20% by weight of other materials may be present, and that other additives including polymers may be blended into the core layer to purposefully affect core layer properties such as gas permeability or moisture resistance in minor amounts.

The multilayer packaging films can further comprise a core polyamide layer comprising a blend of amorphous nylon copolymers. The core polyamide layer can comprise or consist essentially of one or more nylon polymers or copolymers, including one or more polyamides selected from the group consisting of: a high temperature polyamide, a low temperature polyamide, an amorphous nylon copolymer and blends of two or more of these polyamides. Examples of suitable core polyamide compositions are nylon blend compositions disclosed by Vicik in U.S. Pat. No. 5,480,945, which are incorporated herein by reference. Briefly, these nylon blend compositions include blends of an amorphous nylon copolymer and a second nylon polymer having a melting point of at least 145° C. The nylon blend can include about 10-50 weight percent of an amorphous nylon copolymer comprising hexamethylene isophthalamide-hexamethylene terephthalamide units. The nylon blend can further include about 20-90 weight percent of a nylon copolyamide such as nylon 6/12 or nylon 6/66. In other aspects, the core polyamide layer can comprise or consist essentially of a blend of an amorphous nylon copolymer, a low temperature polyamide, a high temperature polyamide, or blends of two or more nylon compositions. For example, the core polyamide layer can be formed from a three-component nylon blend composition disclosed in the first embodiment. The core polyamide layer can optionally have heat resistant properties, and the composition of a core polyamide layer is preferably similar to the composition of a heat resistant layer.

Figure 2:
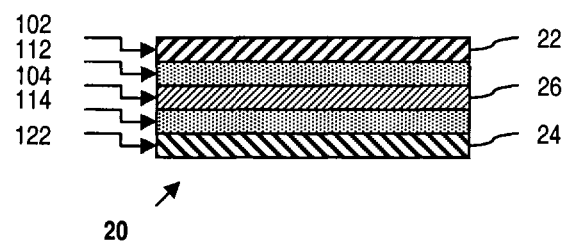
FIG. 2 shows a cross sectional schematic of a second exemplary multilayer film.

For example, some embodiments provide a five layer heat-shrinkable and heat resistant coextruded films. Referring to FIG. 2, a cross section of an example of a five layer heat shrinkable film 20 can comprise an outer surface layer 22 that is a heat resistant layer 102 joined to a first adhesive layer 112. The other side of the first adhesive layer 112 is joined to a core polyamide layer 26 comprising one or more polyamide polymers 104, the other side of which is joined to a second adhesive layer 114. The outer surface layer 24 is a sealant layer 122 that is joined to the second adhesive layer 114.

Figure 3:
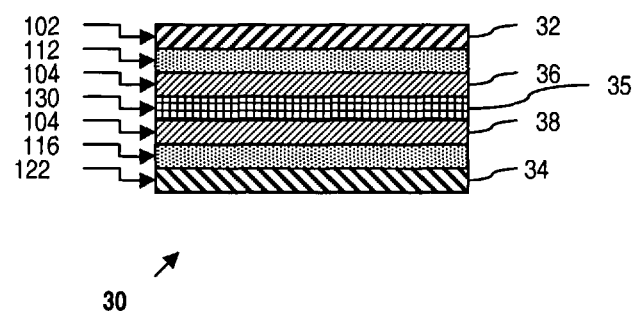
FIG. 3 shows a cross sectional schematic of a third exemplary multilayer film.

Placement of one or more core polyamide layers in contact with an EVOH oxygen barrier layer can provide multilayer free shrink films with a higher total free shrink or improved processability. When EVOH oxygen barrier materials include EVOH materials with an ethylene content of about 44% mol or less in EVOH resins, at least one and preferably two polyamide core layer is preferably included in contact with the EVOH layer. Preferably, when using EVOH oxygen barrier materials with less than 44% mol ethylene, a first polyamide core layer is placed in contact with one side of the EVOH layer, and a second polyamide core layer is placed in contact with the opposite side of the EVOH layer. Referring to FIG. 3, an example of a seven layer film 30 can comprise an outer layer 32 that is a heat resistant layer 102 joined to a first adhesive layer 112. The other side of the first adhesive layer 112 is joined to a first core polyamide layer 36 comprising one or more polyamide polymers 104, the other side of which is joined to an EVOH oxygen barrier layer 114. Similarly, the other side of the oxygen barrier layer 35 comprising EVOH 114, is joined to a second core polyamide layer 38 comprising one or more polyamide polymers 104, the other side of which is joined to a second adhesive layer 116. The outer layer 34 can be a food contact and/or sealant layer 122 that is joined to the second adhesive layer 116.

Various additives may be included in the nylon blend composition, film layers comprising a nylon blend composition or layers of food packaging comprising the same. For example, a layer may be coated with an anti-block powder. Also, conventional antiblock additives, polymeric plasticizers, acid scavengers or slip agents may be added to one or more film layers of the film or it may be free from such added ingredients. If the exterior layer is corona treated, preferably no slip agent will be used, but it will contain or be coated with an anti-block powder or agent such as silica or starch. Processing aides are typically used in amounts less than 10%, less than 7% and preferably less than 5% of the layer weight. A preferred processing aid for use in the outer layer of the film includes one or more of fluoroelastomers, stearamides, erucamides, and silicates.

Desirably, multilayer packaging films can have a total free shrink of at least about 80%, 85%, 90%, 95%, 100%, 105%, 110%, 115%, 120%, 125%, 130%, 135%, or 140% measured at 90° C., or between about 80% and about 120% at 90° C., including about 90%, about 95%, about 100% and about 105%. Preferably, a multilayer packaging film has a free shrink value at 90° C. of at least 30% in at least one of the machine direction or transverse direction. The multilayer packaging films preferably have a free shrink of at least 40% at 90° C. in the machine direction, the transverse direction, or in both the machine direction and the transverse direction. Preferably, the multilayer packaging films have a free shrink in the machine direction of about 30%, 35%, 40%, 45%, 50%, 55%, 60%, 65% or 70% or greater, including any increment of 1%, 0.5% or 0.25% therebetween, measured at 90° C. Preferably, a multilayer packaging film has a free shrink in the transverse direction of about 30%. 35%, 40%, 45%, 50%, 55%, 60%, 65% or 70% or greater, including any increment of 1%, 0.5% or 0.25% therebetween, measured at 90° C. More preferably, multilayer packaging films have a free shrink of at least 40% in two directions. Even more preferably, the multilayer packaging films have a free shrink of at least 40% in a first direction that is the machine direction and at least 50% in a second direction that is the transverse direction.

Various multilayer heat shrinkable and heat resistant coextruded films are also provided. Non-limiting examples of various preferred multilayer film configurations include the following:

Nylon (Exterior)/Adhesive/Sealant (Interior)
Nylon (Exterior)/Adhesive/Nylon Core/Adhesive/Sealant (Interior)
Polyamide (Exterior)/Adhesive/Nylon Core/Adhesive/Sealant (Interior)
Nylon (Exterior)/Adhesive/EVOH/Adhesive/Sealant (Interior)
Nylon (Exterior)/EVOH/Adhesive/Sealant (Interior)
Nylon (Exterior)/EVOH/Nylon Core/Adhesive/Sealant (Interior)
Nylon (Exterior)/EVOH/Core Polyamide/Adhesive/Sealant (Interior)
Polyamide (Exterior)/EVOH/Nylon Core/Adhesive/Sealant (Interior)
Nylon (Exterior)/Adhesive/Nylon Core/Adhesive/Nylon Core/Adhesive/Sealant (Interior)
Nylon (Exterior)/Adhesive/Core Polyamide/Adhesive/Nylon Core/Adhesive/Sealant (Interior)
Nylon (Exterior)/Adhesive/Nylon Core/Adhesive/Core Polyamide/Adhesive/Sealant (Interior)
Polyamide (Exterior)/Adhesive/Nylon Core/Adhesive/Nylon Core/Adhesive/Sealant (Interior)
Nylon (Exterior)/Adhesive/Core Polyamide/EVOH/Core Polyamide/Adhesive/Sealant (Interior)

In the configurations listed above: "Nylon (Exterior)" refers to an exterior layer comprising a nylon blend composition that includes an amorphous nylon copolymer, a high temperature polyamide and a low temperature polyamide; "Adhesive" refers to various adhesive layers positioned within the multilayer film; "Nylon Core" refers to a core layer comprising a nylon blend composition that includes an amorphous nylon copolymer, a high temperature polyamide and a low temperature polyamide; "Polyamide" layer refers to a layer comprising an amorphous nylon copolymer, a high temperature polyamide, a low temperature polyamide, or a blend of any two or more thereof; "Polyamide Core" refers to a core layer with the composition of a "Polyamide" layer; "EVOH" refers to an oxygen barrier layer comprising EVOH, although other materials may be substituted for this layer, such as PVDC, depending on the desired application of the multilayer film; and "Sealant (Interior)" refers to an interior layer that functions as a sealant layer.

Food Packaging

In a third embodiment, food packages are provided that comprise a heat resistant layer. The food packages preferably include one or more layers comprising the nylon blend composition of the first embodiment, and can include a multilayer film of the second embodiment.

Preferably, the food packages are heat-shrinkable, with a total free shrink at 90° C. of at least about 80%. The heat-shrinkable packages can also have a total free shrink measured at 90° C. of about 80%, 85%, 90%, 95%, 100%, 105%, 110%, 115%, 120%, 125%, 130%, 135%, 140% or greater, including any increment of 1%, 0.5% or 0.25% therebetween. At least one heat resistant layer can comprise or consist essentially of a blend of an amorphous nylon copolymer, a low temperature polyamide and a high temperature polyamide. The heat resistant layer can be positioned at or near the exterior surface of the packaging film, and can be an exterior layer. The heat resistant layer can be biaxially oriented.

In some embodiments, the heat-shrinkable food package can further comprise a sealant layer positioned at or near the interior surface of the package, for example as an interior layer. The sealant layers of the heat shrinkable food package are described above with reference to the multilayer heat shrinkable packaging films.

The heat-shrinkable food packages can further comprise a gas barrier layer, such as an oxygen barrier layer, for example as part of a multilayer film forming the food package. The oxygen barrier layer can comprise any suitable material and is preferably positioned between the heat resistant layer and an interior layer. For example, the oxygen barrier layer can be in contact with the heat resistant layer and a adhesive layer. An oxygen barrier layer is preferably an ethylene vinyl alcohol copolymer (EVOH) or PVDC, most preferably EVOH. The gas barrier layers of the heat shrinkable food package are described above with reference to the multilayer heat shrinkable packaging films.

One or more adhesive layers may also be included between a heat resistant exterior surface layer and the interior surface layer. The food packages can further include an oxygen barrier layer positioned between an exterior surface layer and the interior surface layer, optionally in contact with the first adhesive layer, the exterior layer or both. The adhesive layers of the heat shrinkable food package are described above with reference to the multilayer heat shrinkable packaging films.

The heat-shrinkable food packages or the multilayer films can have one or more polyamide core layers that comprise or consist essentially of a polyamide blend composition having an amorphous nylon copolymer, a low temperature polyamide and a high temperature polyamide. The blend compositions can comprise up to about 50%, about 10% to about 50%, about 10% to about 30% or about 20% by weight of the amorphous nylon copolymer. The blend compositions can also comprise up to about 60%, up to about 50%, between about 5% to about 50%, between about 10% to about 40% or about 40% by weight of the low temperature polyamide. Various ratios of the weight percent of the low temperature polyamide to that of the amorphous nylon copolymer in the blend can be used, including ratios of 4:1, 2:1, 1:1, 1:2, 1:4 or any ratio therebetween. The blend compositions can further comprise up to about 80%, between about 20% to about 80%, between about 30% to about 60% or about 40% by weight of the high temperature polyamide. Preferably, the polyamide core layers have the same composition as an exterior heat resistant layer comprising a nylon blend composition.

Figure 4:
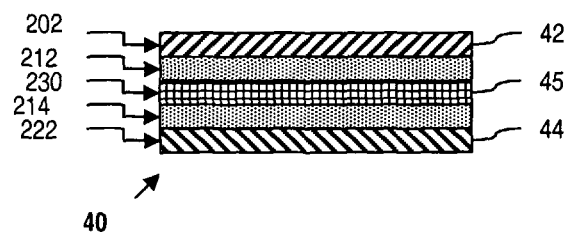
FIG. 4 shows a cross sectional schematic of a fourth exemplary multilayer film.
Figure 5:
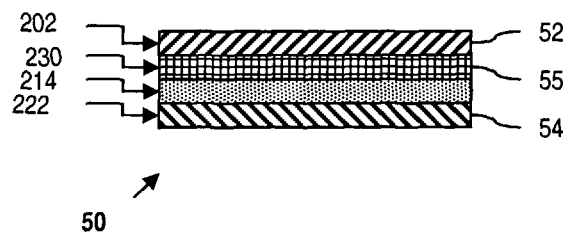
FIG. 5 shows a cross sectional schematic of a fifth exemplary multilayer film.
Figure 6:
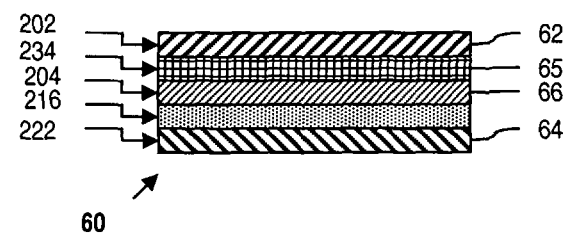
FIG. 6 shows a cross sectional schematic of a sixth exemplary multilayer film.

Some embodiments provide a five layer heat-shrinkable and heat resistant food package or pouch formed from multilayer coextruded films. FIG. 4 shows a cross sectional schematic of an example of a five layer film 40 for use in the package comprising an exterior surface layer 42 that is a heat resistant layer 202 joined to a first adhesive layer 212. The opposite side of the first adhesive layer 212 is joined to a core oxygen barrier layer 45 comprising a barrier material 230, the opposite side of which is joined to a second adhesive layer 214. The interior surface layer 44 is a sealant layer 222 that is joined to the second adhesive layer 214. Optionally, the core oxygen barrier layer 45 can be directly joined to the exterior surface layer 42. For example, in FIG. 5, an exemplary four layer packaging film 50 is formed by omitting the first adhesive layer 212 from the five layer film 40 in FIG. 4, and directly joining the core oxygen barrier layer 55 to the exterior surface layer 52 that is a heat resistant layer 202. Another example of a five-layer film useful in forming a food package is shown in FIG. 6. A food package can be formed from a five layer film 60 that comprise an oxygen barrier layer 65 formed from a barrier material 234 placed between and in contact with a first nylon blend 202 heat resistant layer that is an exterior layer 62 and a second nylon blend core polyamide layer 66 comprising one or more polyamide polymers 204.

Adhesion layer 212 promotes or provides adhesion between a heat resistant layer 202 that is an exterior layer 42, and a core oxygen barrier layer 230 or a core polyamide layer 204. Similarly, adhesion layer 214 promotes or provides adhesion between an oxygen barrier layer 232 and a sealant layer 222 that is an interior layer 54. Likewise, adhesion layer 216 promotes or provides adhesion between a core polyamide layer 204, 206 and a sealant layer 222, that is an interior layer 64, 74. Adhesion layers 212, 214 and 216 may be identical or different from each other, and may include a wide range of anhydride/grafted polyolefins including those based on ethylene vinyl acetate copolymer, polypropylene, low density polypropylene, linear low density polypropylene, and very low density polyethylene. Preferably, the compositions of adhesive layers are based on linear low density polyethylene, such as Plexar® tie resins, or plastomers, such as metallocene-catalyzed polyethylene.

Figure 7:
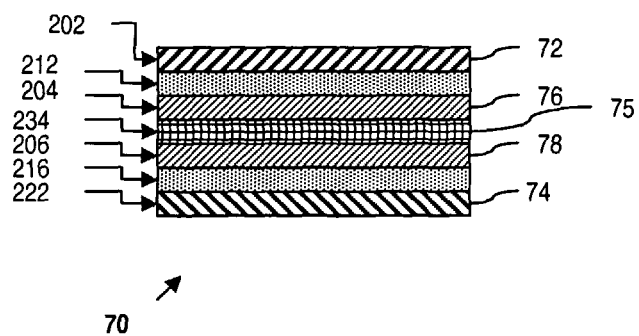
FIG. 7 shows a cross sectional schematic of a seventh exemplary multilayer film.

Food packages can also be formed from seven layer heat shrinkable and heat resistant coextruded films. Referring to FIG. 7, an example of a seven layer film 70 can comprise an exterior surface layer 72 that is a heat resistant nylon blend material 202 joined to a first adhesive layer 212. The other side of the first adhesive layer 212 is joined to a first core polyamide layer 76 comprising one or more polyamide polymers 204, the other side of which is joined to a core oxygen barrier layer 75 formed from a barrier material 234. Similarly, the other side of the core oxygen barrier layer 75 is joined to a second core polyamide layer 78 comprising one or more polyamide polymers 204, the other side of which is joined to a second adhesive layer 216. The interior surface layer 74 is a sealant layer 222 that is joined to the third adhesive layer 216.

In some embodiments, the heat-shrinkable food package can be a cook-in package, preferably when the food package does not comprise a sealant layer. "Cook-in" is the term used to indicate a film or bag in which a foodstuff is pasteurized or cooked. This film or bag is used to hold together, protect and/or form the shape of the foodstuff by a food processor (manufacturer) during the cooking or pasteurization process after which the film may be removed (sometimes termed "stripped"), or may be left on as a protective barrier during shipping, and optionally even left on during retail sale.

Food packages formed from multilayer films having two to fourteen layers are contemplated herein, where each layer is selected from the group consisting of: layers comprising a heat resistant and heat shrinkable nylon blend composition, adhesion layers, oxygen barrier layers, moisture barrier layers, bulk layers and sealant layers. Preferably, the exterior surface layer comprises a nylon blend composition having an amorphous nylon copolymer and a low temperature polyamide. Also preferably, the interior surface layer is a sealant layer.

Methods of Manufacture

The multilayer film may be made by conventional processes including e.g. slot cast or blown film processes, but preferably will be made by an orientation process, especially under conditions to produce a film which is heat shrinkable at 90° C. or less. Descriptions of suitable orientation processes are disclosed in U.S. Pat. No. 5,759,648 to Idlas, which is hereby incorporated by reference in its entirety. Because the film is heat shrinkable, a shrunk film pouch will advantageously cling to the packaged foodstuff even after opening. Non-shrink bags have a tendency to fall away from the sides of the enclosed product once the vacuum is broken by either intentional or accidental opening. Once the film separates from the enclosed article surface, oxygen comes into contact with the article surface and product defects on susceptible products such as ham may occur. Some prior art films and bags are non-shrink bags which suffer from this defect thereby causing spoilage and waste when used to package perishable foodstuffs.

The multilayer films and food packages may be manufactured by coextrusion of all layers simultaneously, for example, as described in published U.S. Pat. Application No. 2004/0166262 to Busche et al., entitled "Easy open heat-shrinkable packaging," and incorporated herein by reference in its entirety. Other manufacturing methods are disclosed in U.S. Pat. No. 4,448,792 (Schirmer), or by a coating lamination procedure such as that described in U.S. Pat. No. 3,741,253 (Brax et al.), to form a relatively thick primary multilayer extrudate either as a flat sheet or, preferably, as a tube. This sheet or tube is oriented by stretching at orientation temperatures, which are generally below the melting points for the predominant resin comprising each layer oriented.

Preferably, the compositions and films are biaxially oriented. Stretch orientation may be accomplished by various known methods e.g. tentering which is commonly employed to orient sheets, or by the well-known trapped bubble or double bubble technique for orienting tubes as for example described in U.S. Pat. No. 3,456,044 (Pahlke). In the bubble technique, an extruded primary tube leaving a tubular extrusion die is cooled, collapsed and then preferably oriented by reheating and inflating to form an expanded secondary bubble, which is again cooled and collapsed. Preferred films are biaxially stretched. Transverse direction (TD) orientation is accomplished by the above noted inflation to radially expand the heated film which is cooled to set the film in an expanded form. Machine direction (MD) orientation is preferably accomplished with the use of sets of nip rolls rotating at different speeds to stretch or draw the film tube in the machine direction thereby causing machine direction elongation which is set by cooling. Orientation may be in either or both directions. Preferably, a primary tube is simultaneously biaxially stretched radially (transversely) and longitudinally (machine direction) to produce a multilayer film which is heat shrinkable at temperatures below the melting points of the major polymeric components, e.g. at 90° C. or lower.

Axially stretched, especially biaxially stretched, films which are "heat shrinkable" as that term is used herein have at least 10% unrestrained shrinkage at 90° C. (10% in both the machine direction (M.D.) and transverse direction (T.D.) for biaxially stretched films). One or more of the essential five film layers may be oriented either uniaxially or biaxially by axial stretching at temperatures low enough to produce low temperature, high shrink multilayer films. Such heat shrinkable multilayer films will have at least 10% shrink in at least one direction at 90° C., but preferably will have at least 20% shrink at 90° C. in at least one direction (preferably both directions) and advantageously may have at least 30% shrink at 90° C. in at least one direction, and preferably may have at least 25% in both M.D. and T.D. directions, and beneficially may have at least 10% shrink at 74° C. in both M.D. and T.D. directions and preferably at least 15% (more preferably at least about 20%) in at least one direction at 74° C.

The general annealing process by which biaxially stretched heat shrinkable films are heated under controlled tension to reduce or eliminate shrinkage values is well known in the art. If desired, films may be annealed to produce lower shrinkage values as desired for the particular temperature. The stretch ratio during orientation should be sufficient to provide a film with a total thickness of between about 1.0 and 4.0 mils. The MD stretch ratio is typically 2½-6 and the TD stretch ratio is also typically 2½-6. An overall or total stretch ratio (MD stretch multiplied by TD stretch) of about 6¼×-36× is suitable.

A preferred method for forming the multilayer film is coextrusion of the primary tube which is then biaxially oriented in a manner similar to that broadly described in the aforementioned U.S. Pat. No. 3,456,044 where the primary tube leaving the die is inflated by admission of a volume of air, cooled, collapsed, and then preferably oriented by reinflating to form a secondary tube termed a "bubble" with reheating to the film's orientation (draw) temperature range. Machine direction (MD) orientation is produced by pulling or drawing the film tube e.g. by utilizing a pair of rollers traveling at different speeds and transverse direction (TD) orientation is obtained by radial bubble expansion. The oriented film is set by rapid cooling.

In the following examples, all layers are coextruded as a primary tube, which is cooled upon exiting the die by spraying with tap water. This primary tube is then reheated to the draw temperature (also called the orientation temperature) for biaxial orientation. The reheating can be accomplished, for example, by radiant heaters or contact with hot water heating. Biaxial orientation can be performed in any suitable manner, preferably using pressurized air to inflate the primary tube and mechanically stretching the film while at or above the orientation temperature. Cooling of oriented films can be accomplished by means of a concentric air ring.

In a preferred process for making films, the resins and any additives are introduced to an extruder (generally one extruder per layer) where the resins are melt plastified by heating and then are transferred to an extrusion (or coextrusion) die for formation into a tube. Extruder and die temperatures will generally depend upon the particular resin or resin containing mixtures being processed and suitable temperature ranges for commercially available resins are generally known in the art, or are provided in technical bulletins made available by resin manufacturers. Processing temperatures may vary depending upon other process parameters chosen. However, variations are expected which may depend upon such factors as variation of polymer resin selection, use of other resins e.g. by blending or in separate layers in the multilayer film, the manufacturing process used and particular equipment and other process parameters utilized. Actual process parameters including process temperatures are expected to be set by one skilled in the art without undue experimentation in view of the present disclosure.

As generally recognized in the art, resin properties may be further modified by blending two or more resins together and it is contemplated that various resins may be blended into individual layers of the multilayer film or added as additional layers, such resins include ethylene-unsaturated ester copolymer resins, especially vinyl ester copolymers such as EVAs, or other ester polymers, very low density polyethylene (VLDPE), linear low density polyethylene (LLDPE), low density polyethylene (LDPE), high density polyethylene (HDPE), nylons, ionomers, polypropylenes, or blends thereof. These resins and others may be mixed by well known methods using commercially available tumblers, mixers or blenders. Also, if desired, well known additives such as processing aids, slip agents, antiblocking agents, pigments, etc., and mixtures thereof may be incorporated into the film.

Various polymer modifiers may be incorporated for the purpose of improving toughness and/or orientability or extensibility of the film. Other modifiers which may be added include: modifiers which improve low temperature toughness or impact strength, and modifiers which reduce modulus or stiffness. Exemplary modifiers include: styrene-butadiene, styrene-isoprene, and ethylene-propylene.

Optionally, the film of the present invention is irradiated to induce crosslinking. In the irradiation process, the film is subjected to an energetic radiation treatment, such as corona discharge, plasma, flame, ultraviolet, X-ray, gamma ray, beta ray, and high energy electron treatment, which induce crosslinking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking the polymer present in the film. In some preferred embodiments, it is preferred to crosslink the entire film to broaden the heat sealing range. This is preferably done by irradiation with an electron beam at dosage levels of at least about 2 megarads (MR) and preferably in the range of 3 to 8 MR, although higher dosages may be employed. Irradiation may be done on the primary tube or after biaxial orientation. The latter, called post-irradiation, is preferred and described in U.S. Pat. No. 4,737,391 (Lustig et al.). An advantage of post-irradiation is that a relatively thin film is treated instead of the relatively thick primary tube, thereby reducing the power requirement for a given treatment level.

Alternatively, crosslinking may be achieved by addition of a chemical crosslinking agent or by use of irradiation in combination with a crosslinking enhancer added to one or more of the layers, as for example described in U.S. Pat. No. 4,055,328 (Evert et al.). The most commonly used crosslinking enhancers are organic peroxides such as trimethylpropane and trimethylacrylate.

Other embodiments are also contemplated herein. For example, various nylon blend compositions are provided. In some embodiments, heat shrinkable nylon blend compositions are provided. The compositions preferably comprise a blend of an amorphous nylon copolymer, a low temperature polyamide and a high temperature polyamide. The compositions are useful to produce single and multilayer films. The blend compositions can also consist essentially of three components: the amorphous nylon copolymer, the low temperature polyamide and the high temperature polyamide. The nylon blend compositions are preferably heat shrinkable. The nylon blend compositions are useful, for example, to form packaging for meat or cheese products.

The weight percent of each nylon blend component is expressed as a weight percent of the total weight of the components of the nylon blend recited above (amorphous nylon, low temperature polyamide and high temperature polyamide), even if multiple polymers are included for one or more of these components. While other materials may be added to the nylon blend composition, the weight percent of each component of the nylon blend composition is still expressed as a weight percentage of the total of the three components described above.

Preferably, nylon blend compositions can include about 5 to about 50 weight percent of the amorphous nylon copolymer, from about 10 to about 30 weight percent of the amorphous nylon copolymer, or between about 15 and about 25 weight percent of the amorphous nylon copolymer, or any combination thereof. Preferably, nylon blend compositions can include from about 5 to about 60 weight percent of the low temperature polyamide, from about 10 to about 40 weight percent of the low temperature polyamide, or between about 20 and about 40 weight percent of the low temperature polyamide. Preferably, the nylon blend composition comprises up to about 80 weight percent, between about 10 and about 70 weight percent, between about 20 and about 70 weight percent, between or between about 30 and about 60 weight percent of the high temperature polyamide. In some embodiments, the nylon blend composition consists essentially of the amorphous nylon copolymer, the low temperature polyamide and the high temperature polyamide.

Preferably, the nylon blend compositions comprise an amorphous nylon copolymer that consists of hexamethylene isophthalamide hexamethylene terephthalamide units and has no measurable melting point or no heat of fusion. More preferably, the nylon blend compositions comprises nylon 6I/6T. Preferably, the nylon blend compositions comprise a nylon 6/69 low temperature polyamide, a high temperature polyamide that is a nylon 6, or mixtures or copolymers thereof.

EXAMPLES

The following are examples and comparative examples.

Experimental results and reported properties of the following examples are based on the following test methods or substantially similar test methods unless noted otherwise.

Oxygen Gas Transmission Rate ($O_2$ GTR): ASTM D-3985-81

Water Vapor Transmission Rate (WVTR): ASTM F 1249-90

Gauge: ASTM D-2103

Melt Index: ASTM D-1238, Condition E (190° C.) (except for propene-based (>50% $C_3$ content) polymers tested at Condition TL(230° C.))

Melting point: ASTM D-3418, DSC with 5° C./min heating rate

Shrinkage Values: Shrinkage values are defined to be values obtained by measuring unrestrained shrink of a 10 cm square sample immersed in water at 90° C. (or the indicated temperature if different) for five seconds. Four test specimens are cut from a given sample of the film to be tested. The specimens are cut into squares of 10 cm length in the machine direction by 10 cm. length in the transverse direction. Each specimen is completely immersed for 5 seconds in a 90° C. (or the indicated temperature if different) water bath. The specimen is then removed from the bath and the distance between the ends of the shrunken specimen is measured for both the M.D. and T.D. directions. The difference in the measured distance for the shrunken specimen and the original 10 cm. side is multiplied by ten to obtain the percent of shrinkage for the specimen in each direction. The shrinkage of four specimens is averaged for the M.D. shrinkage value of the given film sample, and the shrinkage for the four specimens is averaged for the TD shrinkage value. As used herein the term "heat shrinkable film at 90° C." means a film having an unrestrained shrinkage value of at least 10% in at least one direction.

Shrink Force: The shrink force of a film is that force or stress required to prevent shrinkage of the film and was determined from film samples taken from each film. Four film samples were cut 1" (2.54 cm) wide by 7" (17.8 cm) long in the machine direction and 1" (2.54 cm) wide by 7" (17.8 cm) long in the traverse direction. The average thickness of the film samples was determined and recorded. Each film sample was then secured between the two clamps spaced 10 cm apart. One clamp is in a fixed position and the other is connected to a strain gauge transducer. The secured film sample and clamps were then immersed in a silicone oil bath maintained at a constant, elevated temperature for a period of five seconds. During this time, the force in grams at the elevated temperature was recorded. At the end of this time, the film sample was removed from the bath and allowed to cool to room temperature whereupon the force in grams at room temperature was also recorded. The shrink force for the film sample was then determined from the following equation wherein the results is obtained in grams per mil of film thickness (g/mil):

Shrink Force (g/mil)=F/T wherein F is the force in grams and T is the average thickness of the film samples in mils.

Other useful tests are provided by the following references, which are incorporated herein in their entirety: U.S. patent application Ser. No. 09/652,591, entitled "IRRADIATED BIAXIALLY ORIENTED FILM," by Scott Idlas; and U.S. Pat. Nos. 6,777,046 and 5,759,648.

Provide below are non-limiting examples of the compositions, films and packages disclosed herein. In all the following examples, unless otherwise indicated, the film compositions are produced generally utilizing the apparatus and method described in U.S. Pat. No. 3,456,044 (Pahlke), which describes a coextrusion type of double bubble method, and in further accordance with the detailed description above. All percentages are by weight unless indicated otherwise.

Multilayer layer tubular films are made by a biaxial stretching orientation process. However, films of five or more layers are also contemplated. The inventive multilayer films may include additional layers or polymers to add or modify various properties of the desired film such as heat sealability, interlayer adhesion, food surface adhesion, shrinkability, shrink force, wrinkle resistance, puncture resistance, printability, toughness, gas or water barrier properties, abrasion resistance and optical properties such as gloss, haze, freedom from lines, streaks or gels. These layers may be formed by any suitable method including coextrusion, extrusion coating and lamination.

Example 1

Heat Shrinkable Nylon Blend Compositions

Heat resistant nylon blend compositions were made into films. Films 1-4 were made from blends of an amorphous nylon copolymer (nylon 6I/6T), a low temperature polyamide (nylon 6/69) and a high temperature polyamide (nylon 6/66 or nylon 6/12). The free shrink at 90° C. was measured for each film and the total free shrink was calculated. The composition of films 1-4 and the corresponding free shrink data are provided in Table 1 below.

TABLE 1

| Film No. | Nylon materials | Free shrink at 90° C. (MD x TD) | Total Free Shrink at 90° C. |
|---|---|---|---|
| 1 | 20% nylon 6I/6T (DuPont 3426) 40% nylon 6/69 (EMS BM13SBG) 40% nylon 6/66 (BASF C35) | 50 x 52 | 102 |
| 2 | 20% nylon 6I/6T (DuPont 3426) 40% nylon 6/69 (EMS BM13SBG) 40% nylon 6/12 (EMS CR9) | 44 x 50 | 94 |
| 3 | 20% nylon 6I/6T (DuPont 3426) 10% nylon 6/69 (EMS BM13SBG) 70% nylon 6/12 (EMS CR9) | 40 x 47 | 87 |

TABLE 1-continued

| Film No. | Nylon materials | Free shrink at 90° C. (MD × TD) | Total Free Shrink at 90° C. |
|---|---|---|---|
| 4 | 20% nylon 6I/6T (DuPont 3426) 20% nylon 6/69 (EMS BM13SBG) 60% nylon 6/66 (BASF C35) | 40 × 49 | 89 |

Comparative Example 2

Nylon Containing Films

The free shrink was measured at 900 for sheets of certain polyamide materials, including certain high temperature polyamides (nylon 6/66 and nylon 6/12) and low temperature polyamides (nylon 6/69), as indicated in Table 2.

TABLE 2

| Film No. | Nylon materials | Free shrink at 90° C. (MD × TD) | Total Free Shrink at 90° C. |
|---|---|---|---|
| 5 | 100% nylon 6/IPDI (Bayer C38) | 22 × 37 | 59 |
| 6 | 100% nylon 12 (EMS L20) | 22 × 40 | 62 |
| 7 | 100% nylon 6/69 (BM13SBG) | 31 × 40 | 71 |
| 8 | 100% nylon 66/610 (EMS BM20SBG) | 30 × 43 | 73 |
| 9 | 50% nylon 6/12 (EMS CR9) 50% nylon 6/12 (CF6S) | 37 × 43 | 80 |
| 10 | 100% nylon 6/12 (EMS CR9) | 40 × 44 | 84 |
| 11 | 50% nylon 6/66 (BASF C35) 50% nylon 6/69 (EMS BM13SBG) | 40 × 48 | 88 |
| 12 | 100% nylon 6/12 (CF6S) | 43 × 47 | 90 |

Comparative Example 3

Nylon Containing Films

A film (film 13) containing an amorphous nylon copolymer (nylon 6I/6T) and a high temperature nylon (nylon 6/66), but no low temperature nylon, was made. The free shrink at 90° C. was measured. The composition of film 13 and the corresponding free shrink data are included in Table 3 below.

TABLE 3

| Film No. | Nylon materials | Free shrink at 90° C. (MD × TD) | Total Free Shrink at 90° C. |
|---|---|---|---|
| 13 | 15% nylon 6I/6T (DuPont 3426) 85% nylon 6/66 (BASF C35) | 31 × 44 | 75 |

Example 4

Five-Layer Film

A five-layer film was produced having the following schematic configuration, further described in Table 4 and Table 5:

Nylon Blend 1/Adhesive 1/Oxygen Barrier 1/Adhesive 1/Sealant 1

TABLE 4

| Film No. | Layer | Type | Composition | Basis Wt. | Description |
|---|---|---|---|---|---|
| 14 | 1 | Nylon Blend 1 | 40% nylon 6/66 40% nylon 6/69 20% nylon 6I/6T | 3.14 (10.5% wt) | Heat resistant exterior layer |
| | 2 | Adhesive 1 | 30% EVA1 20% LLDPE 50% Plastomer | 8.00 (26.7% wt) | Tie layer |
| | 3 | Oxygen Barrier 1 | 100% EVOH-1 | 2.39 (10.0% wt) | Oxygen barrier layer |
| | 4 | Adhesive 1 | 30% EVA1 20% LLDPE 50% Plastomer | 12.38 (43.3% wt) | Tie layer |
| | 5 | Sealant 1 | 95% homogeneous EAO: 5% Processing Aid | 4.03 (13.5% wt) | Sealing layer |

The first layer (which is the exterior surface of the tubular film) provides a heat resistant exterior layer and comprises a blend of a nylon 6I/6T amorphous nylon copolymer, a nylon 6/69 low temperature polyamide and a nylon 6/66 high temperature polyamide. The fifth layer is a sealant layer that forms the interior surface of the multilayer structure. The third layer is an oxygen barrier layer. The second and the fourth layers are adhesive layers between the first layer and the oxygen barrier layer, and between the sealant layer and the oxygen barrier layer, respectively. The materials used in making film 14 are described in the table below.

TABLE 5

| Layer | Composition | Materials |
|---|---|---|
| 1 | 40% nylon 6/66 | C35 nylon 6/66 copolymer resin (BASF) |
| | 40% nylon 6/69 | BM13 SBG nylon 6/69 copolymer resin (EMS) |
| | 20% nylon 6I/6T | Selar PA-3426 amorphous nylon 6I/6T (DuPont) |
| 2 | 30% EVA1 | Exxon LD 701.ID EVA (10.5% VA, 0.2 MI) resin |
| | 20% LLDPE | PLEXAR 3080 tie layer resin (Equistar) (Anhydride modified polyethylene tie layer resin) |
| | 50% Plastomer | Exact SLP 9523 plastomer (0.895 g/cc, 1.0 MI) (Exxon) |
| 3 | 100% EVOH 1 | 44 mol % EVOH resin E151B (Evalca) |
| 4 | 30% EVA1 | Exxon LD 701.ID EVA (10.5% VA, 0.2 MI) resin |
| | 20% LLDPE | PLEXAR 3080 tie layer resin (Equistar) (Anhydride modified polyethylene tie layer resin) |
| | 50% Plastomer | Exact SLP 9523 plastomer (0.895 g/cc, 1.0 MI) (Exxon) |
| 5 | 95% homogeneous EAO | Exact 3040 (metallocene catalyzed) LLDPE Resin |
| | 5% Processing Aid | A27023 VLDPE Processing Aid/Slip Conc. (5/1.9)(Erucamide)(Spartech) |

One extruder is used for each layer and the heat plastified resins from each extruder are introduced to a 7-layer spiral plate coextrusion die. To make a five layer film from a seven layer spiral plate coextrusion die, the resin or resin mixture to form the second layer of the multilayer film was fed through both the second and the third layer portions of the seven layer spiral coextrusion die. Similarly, the resin or resin mixture to form the fourth layer of the multilayer film was fed through both the fifth and the sixth layer portions of the seven layer spiral coextrusion die. For example, for layer 2 (adhesion layer) of film 14 was made by coextruding the EVA1, LLDPE and Plastomer materials from both the second and third layer portions of the seven layer die to form one continuous second layer in the film. Likewise, layer 4 (adhesion layer) of film 14 was formed by coextruding materials from layers five and six of the seven layer coextrusion die, thereby forming the fourth layer of the film.

The multilayer film 14 was coextruded from a seven layer die at a first (sealant)/second (adhesion)/third (adhesion)/fourth (oxygen barrier)/fifth (adhesion)/sixth (adhesion)/seventh (heat resistant) layer basis weight ratios indicated in Table 4. The layer 2 (adhesion) layer of film 14 was produced from the fifth and sixth layer portions of the seven layer die with a basis weight ratio that together form layer 2 (adhesion layer) of the final five layer film. Similarly, the layer 4 (adhesion layer) of film 14 was produced from the second and third layer portions of the seven layer die with a basis weight ratio that together form layer 4 (adhesion layer) of the final five layer film. Therefore, the five layer film 14 was coextruded with a first/second/third/fourth/fifth layer basis weight ratio of about indicated in Table 4.

For each layer, the resin or resin mixture is fed from a hopper into an attached single screw extruder where the resin and/or mixture is heat plastified and extruded through a five layer coextrusion spiral plate die into a primary tube. The extruder barrel temperatures are: for the first (sealant) layer about 300-330° F.; second and fourth (adhesion) layers are about 330°-340° F.; for the third (core) layer is about 350°-400° F.; and the fifth (heat resistant layer) is about 400-450° F.

The extrusion die has an annular exit opening of 3.5-inch diameter with a 0.080 inch gap. The coextrusion die temperature profile is set from about 340° F. to 430° F. The extruded multilayer primary tube is cooled by spraying with cold tap water (about 40°-60° F.).

The cooled primary tube is flattened by passage through a pair of nip rollers whose speed is controlled to neck down the primary tube to adjust the tube circumference or flatwidth. A flattened tube of about 2-5 inches flatwidth is preferred. The cooled flattened primary tube is reheated, biaxially stretched, and cooled.

The cooled film is flattened, and the biaxially stretched and biaxially oriented film is wound on a reel. The machine direction (M.D.) draw or orientation ratio is about 3.0:1 to 4.0:1 and the transverse direction (T.D.) bubble or orientation ratio is about 2.8:1 to 3.5:1. The draw point or orientation temperature is below the predominant melting point for each layer oriented and above that layer's glass transition point. Draw point temperature, bubble heating and cooling rates and orientation ratios are generally adjusted to maximize bubble stability and throughput for the desired amount of stretching or orientation. The resultant film 14 of Example 4 can have a thickness of about 1.6 mils, but can be made with any suitable thickness, preferably with a gauge of about 1.5 to 2.5 mils.

Films, bags and packages may also employ combinations of characteristics as described in one or more embodiments.

Example 5

Seven-Layer Film

A seven-layer film was produced having the following schematic configuration, as described in Table 6 and Table 7:

Nylon blend 2/Adhesive 2/Nylon blend 3/Oxygen Barrier 1/Nylon blend 3/Adhesive 2/Sealant 2

TABLE 6

| Film No. | Layer | Type | Composition | Basis Wt. | Description |
|---|---|---|---|---|---|
| 15 | 1 | Nylon blend 2 | 53% nylon 6<br>20% nylon 6/69<br>20% nylon 6I/6T<br>7% Antiblock/Slip Aid | 1.28 (5.3% wt) | Heat resistant exterior layer |
| | 2 | Adhesive 2 | 20% EVA1<br>30% LLDPE<br>50% Plastomer | 5.31 (22.2% wt) | Tie layer |
| | 3 | Nylon blend 3 | 35% nylon 6<br>45% nylon 6/69<br>20% nylon 6I/6T | 1.28 (5.3% wt) | Core polyamide layer |
| | 4 | Oxygen Barrier 1 | 100% EVOH 1 | 1.91 (8.0% wt) | Oxygen barrier layer |
| | 5 | Nylon blend 3 | 35% nylon 6<br>45% nylon 6/69<br>20% nylon 6I/6T | 1.28 (5.3% wt) | Core polyamide layer |
| | 6 | Adhesive 2 | 20% EVA1<br>30% LLDPE<br>50% Plastomer | 9.66 (40.4% wt) | Tie layer |
| | 7 | Sealant 2 | 90% homogeneous EAO<br>10% Processing Aid | 3.22 (13.5% wt) | Sealing layer |

The first layer (which is the exterior surface of the tubular film) provides a heat resistant exterior layer and comprises a blend of a nylon 6I/6T amorphous nylon copolymer, a nylon 6/69 low temperature polyamide and a nylon 6 high temperature polyamide. The third and fifth layers are core polyamide layers comprising a blend of a nylon 6I/6T amorphous nylon copolymer, a nylon 6/69 low temperature polyamide and a nylon 6 high temperature polyamide. The seventh layer is a sealant layer that forms the interior surface of the multilayer structure. The fourth layer is an oxygen barrier layer. The second and the sixth layers are adhesive layers between the first layer and the oxygen barrier layer, and between the sealant layer and the oxygen barrier layer, respectively. The materials used in making film 15 are described in the table below.

TABLE 7

| Layer | Composition | Materials |
|---|---|---|
| 1 | 53% nylon 6 | Ultramid B36 nylon 6 copolymer resin (BASF) |
|   | 20% nylon 6/69 | BM13 SBG nylon 6/69 copolymer resin (EMS) |
|   | 20% nylon 6I/6T | Selar PA-3426 amorphous nylon 6I/6T (DuPont) |
|   | 7% Antiblock/Slip Aid | Nylon 6/66 - based antiblock-slip aid |
| 2 | 20% EVA1 | EVA (10.5% VA, 0.2 MI) resin |
|   | 30% LLDPE | Anhydride modified polyethylene tie layer resin |
|   | 50% Plastomer | Plastomer (0.895 g/cc, 1.0 MI) |
| 3 | 35% nylon 6 | Ultramid B36 nylon 6 copolymer resin (BASF) |
|   | 45% nylon 6/69 | BM13 SBG nylon 6/69 copolymer resin (EMS) |
|   | 20% nylon 6I/6T | Selar PA-3426 amorphous nylon 6I/6T (DuPont) |
| 4 | 100% EVOH 1 | 44 mol % EVOH resin E151B (Evalca) |
| 5 | 35% nylon 6 | Ultramid B36 nylon 6 copolymer resin (BASF) |
|   | 45% nylon 6/69 | BM13 SBG nylon 6/69 copolymer resin (EMS) |
|   | 20% nylon 6I/6T | Selar PA-3426 amorphous nylon 6I/6T (DuPont) |
| 6 | 20% EVA1 | EVA (10.5% VA, 0.2 MI) resin |
|   | 30% LLDPE | Anhydride modified polyethylene tie layer resin |
|   | 50% Plastomer | Plastomer (0.895 g/cc, 1.0 MI) |
| 7 | 90% homogeneous EAO | Exact 3040 (metallocene catalyzed) LLDPE Resin |
|   | 10% Processing Aid | VLDPE Processing Aid/Slip Conc. |

One extruder is used for each layer and the heat plastified resins from each extruder are introduced to a 7-layer spiral plate coextrusion die. To make a seven layer film from a seven layer spiral plate coextrusion die, the resin or resin mixture to form each layer of the multilayer film was fed through each of the seven layer spiral coextrusion die. The multilayer film 15 was coextruded from a seven layer die at the basis weight ratio described in Table 6. For each layer, the resin or resin mixture is fed from a hopper into an attached single screw extruder where the resin and/or mixture is heat plastified and extruded through a five layer coextrusion spiral plate die into a primary tube. The extruder barrel temperatures are: for the sealant layer (layer 7) about 295-330° F.; second and sixth (adhesion) layers are about 295°-340° F.; for the fourth (oxygen barrier) layer is about 340°-400° F.; and the first, third, and fifth (nylon or nylon blend layers) are about 400-490° F.

The extrusion die has an annular exit opening of 3.5-inch diameter with a 0.080 inch gap. The coextrusion die temperature profile is set from about 295° F. to 430° F. The extruded multilayer primary tube is cooled by spraying with cold tap water (about 40°-60° F.).

The cooled primary tube is flattened by passage through a pair of nip rollers whose speed is controlled to neck down the primary tube to adjust the tube circumference or flatwidth. A flattened tube of about 2-5 inches flatwidth is preferred. The cooled flattened primary tube is reheated, biaxially stretched, and cooled.

The cooled film is flattened, and the biaxially stretched and biaxially oriented film is wound on a reel. The machine direction (M.D.) draw or orientation ratio is about 3.0:1 to 4.0:1 and the transverse direction (T.D.) bubble or orientation ratio is about 2.8:1 to 3.5:1. The draw point or orientation temperature is below the predominant melting point for each layer oriented and above that layer's glass transition point. Draw point temperature, bubble heating and cooling rates and orientation ratios are generally adjusted to maximize bubble stability and throughput for the desired amount of stretching or orientation.

The resultant film 14 of Example 5 can have a thickness of about 1.6 mils, but can be made with any suitable thickness, preferably with a gauge of about 1.5 to 2.5 mils. The total thickness of the 7-layer films described in Table 6 can be between about 0.4 mils and about 10 mils, preferably between 1.2 mils and 2.0 mils, and typically were about 1.6 mils.

The free shrink of the 7-layer films described in Table 6 was greater than about 38×45 (total free shrink of 83%), and typically about 46×50 (total free shrink of 96%).

Example 6

Seven-Layer Film with Polypropylene Food Contact Layer

A seven-layer film was produced having the following schematic configuration, as described in Table 8 and Table 9:

| Nylon blend 2/Adhesive 2/Nylon blend 3/Oxygen Barrier 1/Nylon blend 3/Adhesive 3/Polypropylene 1 |
|---|

TABLE 8

| Film No. | Layer | Type | Composition | Basis Wt. | Description |
|---|---|---|---|---|---|
| 16 | 1 | Nylon blend 2 | 53% nylon 6<br>20% nylon 6/69<br>20% nylon 6I/6T<br>7% Antiblock/Slip Aid | 3.18 (9.2% wt) | Heat resistant exterior layer |
|    | 2 | Adhesive 2 | 20% EVA1<br>30% LLDPE<br>50% Plastomer | 8.22 (23.8% wt) | Tie layer |
|    | 3 | Nylon blend 3 | 35% nylon 6<br>45% nylon 6/69<br>20% nylon 6I/6T | 1.85 (5.4% wt) | Core polyamide layer |
|    | 4 | Oxygen Barrier 1 | 100% EVOH 1 | 2.88 (8.3% wt) | Oxygen barrier layer |
|    | 5 | Nylon blend 3 | 35% nylon 6<br>45% nylon 6/69<br>20% nylon 6I/6T | 1.85 (5.4% wt) | Core polyamide layer |
|    | 6 | Adhesive 3 | 100% Polypropylene Tie Layer Resin | 8.40 (24.3% wt) | Tie layer |

TABLE 8-continued

| Film No. | Layer | Type | Composition | Basis Wt. | Description |
|---|---|---|---|---|---|
| | 7 | Polypropylene 1 | 100% Polypropylene | 8.16 (23.6% wt) | Food Contact Layer |

The first layer (which is the exterior surface of the tubular film) provides a heat resistant exterior layer and comprises a blend of a nylon 6I/6T amorphous nylon copolymer, a nylon 6/69 low temperature polyamide and a nylon 6 high temperature polyamide. The third and fifth layers are core polyamide layers comprising a blend of a nylon 6I/6T amorphous nylon copolymer, a nylon 6/69 low temperature polyamide and a nylon 6 high temperature polyamide. The seventh layer is a food contact layer that forms the interior surface of the multilayer structure. The fourth layer is an oxygen barrier layer. The second and the sixth layers are adhesive layers between the heat resistant exterior layer and a first core polyamide layer, and between the food contact layer and a second core polyamide layer, respectively. The materials used in making film 16 are described in Table 9 below.

TABLE 9

| Layer | Composition | Materials |
|---|---|---|
| 1 | 53% nylon 6 | Ultramid B36 nylon 6 copolymer resin (BASF) |
| | 20% nylon 6/69 | BM13 SBG nylon 6/69 copolymer resin (EMS) |
| | 20% nylon 6I/6T | Selar PA-3426 amorphous nylon 6I/6T (DuPont) |
| | 7% Antiblock/Slip Aid | Nylon 6/66 - based antiblock-slip aid |
| 2 | 20% EVA1 | EVA (10.5% VA, 0.2 MI) resin |
| | 30% LLDPE | Anhydride modified polyethylene tie layer resin |
| | 50% Plastomer | Plastomer (0.895 g/cc, 1.0 MI) |
| 3 | 35% nylon 6 | Ultramid B36 nylon 6 copolymer resin (BASF) |
| | 45% nylon 6/69 | BM13 SBG nylon 6/69 copolymer resin (EMS) |
| | 20% nylon 6I/6T | Selar PA-3426 amorphous nylon 6I/6T (DuPont) |
| 4 | 100% EVOH 1 | 44 mol % EVOH resin E151B (Evalca) |
| 5 | 35% nylon 6 | Ultramid B36 nylon 6 copolymer resin (BASF) |
| | 45% nylon 6/69 | BM13 SBG nylon 6/69 copolymer resin (EMS) |
| | 20% nylon 6I/6T | Selar PA-3426 amorphous nylon 6I/6T (DuPont) |
| 6 | 100% PP Tie Layer Resin | PLEXAR ® PX 6006 PP tie layer resin (Equistar) |
| 7 | 100% Polypropylene | KS-409 ELTEX ® Polypropylene (BP) |

One extruder is used for each layer and the heat plastified resins from each extruder are introduced to a 7-layer spiral plate coextrusion die, as described with respect to Example 5. To make a seven layer film from a seven layer spiral plate coextrusion die, the resin or resin mixture to form each layer of the multilayer film was fed through each of the seven layer spiral coextrusion die. The multilayer film 16 was coextruded from a seven layer die at the basis weight ratio described in Table 8. For each layer, the resin or resin mixture is fed from a hopper into an attached single screw extruder where the resin and/or mixture is heat plastified and extruded through a five layer coextrusion spiral plate die into a primary tube. The extruder barrel temperatures were set to suitable temperatures to obtain the multilayer film. The extrusion die has an annular exit opening of 3.5-inch diameter with a 0.080 inch gap. The coextrusion die temperature profile is set from about 295° F. to 430° F. The extruded multilayer primary tube is cooled by spraying with cold tap water (about 40°-60° F.).

The cooled primary tube is flattened by passage through a pair of nip rollers whose speed is controlled to neck down the primary tube to adjust the tube circumference or flatwidth. A flattened tube of about 2-5 inches flatwidth is preferred. The cooled flattened primary tube is reheated, biaxially stretched, and cooled.

The cooled film is flattened, and the biaxially stretched and biaxially oriented film is wound on a reel. The machine direction (M.D.) draw or orientation ratio is about 3.0:1 to 4.0:1 and the transverse direction (T.D.) bubble or orientation ratio is about 2.8:1 to 3.5:1. The draw point or orientation temperature is below the predominant melting point for each layer oriented and above that layer's glass transition point. Draw point temperature, bubble heating and cooling rates and orientation ratios are generally adjusted to maximize bubble stability and throughput for the desired amount of stretching or orientation.

The total thickness of the 7-layer films described in Table 8 can be between about 0.4 mils and about 10 mils, preferably between 2.0 mils and 2.7 mils, and typically were about 2.25 mils. The free shrink of the 7-layer films described in Table 8 was greater than about 38×45 (total free shrink of 83%), and typically about 46×50 (total free shrink of 96%).

Example 7

Seven-Layer Film with Polyethylene Food Contact Layer

A seven-layer film was produced having the following schematic configuration, as described in Table 10 and Table 11:

| Nylon blend 2/Adhesive 2/Nylon blend 3/Oxygen Barrier 1/Nylon blend 3/Adhesive 3/Polyethylene 1 |
|---|

TABLE 10

| Film No. | Layer | Type | Composition | Basis Wt. | Description |
|---|---|---|---|---|---|
| 17 | 1 | Nylon blend 2 | 53% nylon 6 20% nylon 6/69 | 3.18 (9.2% wt) | Heat resistant exterior layer |

TABLE 10-continued

| Film No. | Layer | Type | Composition | Basis Wt. | Description |
|---|---|---|---|---|---|
| | 2 | Adhesive 2 | 20% nylon 6I/6T<br>7% Antiblock/Slip Aid<br>20% EVA1<br>30% LLDPE<br>50% Plastomer | 8.22 (23.8% wt) | Tie layer |
| | 3 | Nylon blend 3 | 35% nylon 6<br>45% nylon 6/69<br>20% nylon 6I/6T | 1.85 (5.4% wt) | Core polyamide layer |
| | 4 | Oxygen Barrier | 100% EVOH 1 | 2.88 (8.3% wt) | Oxygen barrier layer |
| | 5 | Nylon blend 3 | 35% nylon 6<br>45% nylon 6/69<br>20% nylon 6I/6T | 1.85 (5.4% wt) | Core polyamide layer |
| | 6 | Adhesive 2 | 20% EVA1<br>30% LLDPE<br>50% Plastomer | 11.40 (33.0% wt) | Tie layer |
| | 7 | Polyethylene | 100% Polyethylene | 5.16 (14.9% wt) | Food Contact Layer |

The first layer (which is the exterior surface of the tubular film) provides a heat resistant exterior layer and comprises a blend of a nylon 6I/6T amorphous nylon copolymer, a nylon 6/69 low temperature polyamide and a nylon 6 high temperature polyamide. The third and fifth layers are core polyamide layers comprising a blend of a nylon 6I/6T amorphous nylon copolymer, a nylon 6/69 low temperature polyamide and a nylon 6 high temperature polyamide. The seventh layer is a food contact layer that forms the interior surface of the multilayer structure. The fourth layer is an oxygen barrier layer. The second and the sixth layers are adhesive layers between the heat resistant exterior layer and a first core polyamide layer, and between the food contact layer and a second core polyamide layer, respectively. The materials used in making film 17 are described in Table 11 below.

TABLE 11

| Layer | Composition | Materials |
|---|---|---|
| 1 | 53% nylon 6 | Ultramid B36 nylon 6 copolymer resin (BASF) |
| | 20% nylon 6/69 | BM13 SBG nylon 6/69 copolymer resin (EMS) |
| | 20% nylon 6I/6T | Selar PA-3426 amorphous nylon 6I/6T (DuPont) |
| | 7% Antiblock/Slip Aid | Nylon 6/66 - based antiblock-slip aid |
| 2 | 20% EVA1 | EVA (10.5% VA, 0.2 MI) resin |
| | 30% LLDPE | Anhydride modified polyethylene tie layer resin |
| | 50% Plastomer | Plastomer (0.895 g/cc, 1.0 MI) |
| 3 | 35% nylon 6 | Ultramid B36 nylon 6 copolymer resin (BASF) |
| | 45% nylon 6/69 | BM13 SBG nylon 6/69 copolymer resin (EMS) |
| | 20% nylon 6I/6T | Selar PA-3426 amorphous nylon 6I/6T (DuPont) |
| 4 | 100% EVOH 1 | 44 mol % EVOH resin E151B (Evalca) |
| 5 | 35% nylon 6 | Ultramid B36 nylon 6 copolymer resin (BASF) |
| | 45% nylon 6/69 | BM13 SBG nylon 6/69 copolymer resin (EMS) |
| | 20% nylon 6I/6T | Selar PA-3426 amorphous nylon 6I/6T (DuPont) |
| 6 | 20% EVA1 | EVA (10.5% VA, 0.2 MI) resin |
| | 30% LLDPE | Anhydride modified polyethylene tie layer resin |
| | 50% Plastomer | Plastomer (0.895 g/cc, 1.0 MI) |
| 7 | 100% Polyethylene | 2045G DOWLEX LLDPE Resin (Dow) |

One extruder is used for each layer and the heat plastified resins from each extruder are introduced to a 7-layer spiral plate coextrusion die, as described with respect to Example 5. To make a seven layer film from a seven layer spiral plate coextrusion die, the resin or resin mixture to form each layer of the multilayer film was fed through each of the seven layer spiral coextrusion die. The multilayer film 16 was coextruded from a seven layer die at the basis weight ratio described in Table 10. For each layer, the resin or resin mixture is fed from a hopper into an attached single screw extruder where the resin and/or mixture is heat plastified and extruded through a five layer coextrusion spiral plate die into a primary tube. The extruder barrel temperatures were set to suitable temperatures to obtain the multilayer film. The extrusion die has an annular exit opening of 3.5-inch diameter with a 0.080 inch gap. The coextrusion die temperature profile is set from about 295° F. to 430° F. The extruded multilayer primary tube is cooled by spraying with cold tap water (about 40°-60° F.).

The cooled primary tube is flattened by passage through a pair of nip rollers whose speed is controlled to neck down the primary tube to adjust the tube circumference or flatwidth. A flattened tube of about 2-5 inches flatwidth is preferred. The cooled flattened primary tube is reheated, biaxially stretched, and cooled.

The cooled film is flattened, and the biaxially stretched and biaxially oriented film is wound on a reel. The machine direction (M.D.) draw or orientation ratio is about 3.0:1 to 4.0:1 and the transverse direction (T.D.) bubble or orientation ratio is about 2.8:1 to 3.5:1. The draw point or orientation temperature is below the predominant melting point for each layer oriented and above that layer's glass transition point. Draw point temperature, bubble heating and cooling rates and orientation ratios are generally adjusted to maximize bubble stability and throughput for the desired amount of stretching or orientation.

The total thickness of the 7-layer films described in Table 10 can be between about 0.4 mils and about 10 mils, preferably between 2.0 mils and 2.7 mils, and typically were about 2.25 mils. The free shrink of the 7-layer films described in Table 10 was at least about 38×44 (total free shrink of 82%), and typically about 46×50 (total free shrink of 96%). Film 17 had a free shrink of 38×44 (total free shrink of 82%).

Films, bags and packages may also employ combinations of characteristics as described in one or more embodiments.

The above examples are illustrative only, and should not be interpreted as limiting since further modifications of the disclosed embodiments will be apparent to those skilled in the art in view of this teaching. All such modifications are deemed to be within the scope of the embodiments disclosed herein.

We claim:

1. A multilayer heat-shrinkable packaging film having an interior surface and an exterior surface, the film comprising:
    a first outer layer forming at least a portion of the exterior surface, wherein the first outer layer comprises a blend of between about 5% and about 50% by weight of the blend of an amorphous nylon copolymer; between about 5% and about 50% by weight of the blend of a low temperature polyamide having a melting point of less than 155° C.; and between about 5% and about 80% by weight of the blend of a high temperature polyamide having a melting point of at least 155° C.;
    a second layer that is a sealant layer forming at least a portion of the interior surface, wherein the second layer comprises an ethylene-alpha-olefin;
    an oxygen barrier layer positioned between the first outer layer and the second layer;
    a first adhesive layer positioned between and in direct contact with each of the first outer layer and the oxygen barrier layer; and
    a second adhesive layer positioned between and in direct contact with each of the oxygen barrier layer and the second layer;
    wherein the film has a total free shrink value at 90° C. of at least 80%.

2. The film of claim 1, wherein the film has a total free shrink value at 90° C. of at least 95%.

3. The film of claim 1, wherein the film has a free shrink value at 90° C. of at least 40% in both the machine direction and the transverse direction.

4. The film of claim 1, wherein the amorphous nylon copolymer comprises nylon 6I/6T, nylon 66/6I/69 or nylon 66/6I/6T copolymer.

5. The film of claim 1, wherein the low temperature polyamide is nylon 6/69 copolymer.

6. The film of claim 1, wherein the high temperature polyamide is nylon 6, nylon 6/66 or nylon 6/12 copolymer.

7. A multilayer heat-shrinkable packaging film having an interior surface defining a pouch for containing food and an exterior surface, the film comprising:
    a heat resistant layer forming at least a portion of the exterior surface, the heat resistant layer comprising a blend consisting essentially of between about 5 and about 50% weight percent of the blend of an amorphous nylon copolymer, between about 5 and about 50% weight percent of the blend of a low temperature polyamide having a melting point of less than about 155° C., and between about 5% and about 80% of weight percent of the blend of a high temperature polyamide having a melting point of at least about 155° C.;
    a sealant layer forming at least a portion of the interior surface, the sealant layer comprising an ethylene-alpha-olefin;
    a core oxygen barrier layer positioned between the heat resistant layer and the sealant layer;
    a first adhesive layer positioned between and in direct contact with each of the heat resistant layer and the oxygen barrier layer; and
    a second adhesive layer positioned between and in direct contact with each of the oxygen barrier layer and the sealant layer;
    wherein the film has a total free shrink value at 90° C. of at least 80%.

8. The film of claim 7, wherein the high temperature polyimide is nylon 6.

9. The film of claim 7, wherein the film has 5 coextruded layers.

10. The film of claim 7, wherein the oxygen barrier layer comprises EVOH.

11. The film of claim 7, wherein the oxygen barrier layer comprises PVDC.

12. The film of claim 7 wherein the film has 5 to 7 coextruded layers.

13. A food package having an interior surface and an exterior surface, the food package comprising a heat-shrinkable packaging film, the packaging film comprising:
    a heat resistant layer forming at least a portion of the exterior surface, wherein the heat resistant layer comprises a blend of between about 10 and about 30 weight percent of the blend of an amorphous nylon copolymer, between about 10 and about 50 weight percent of the blend of a low temperature polyamide having a melting point of less than about 155° C., and between about 30 and about 80 weight percent of the blend of a high temperature polyamide selected from nylon 6 or nylon 6/66;
    a sealant layer forming at least a portion of the interior surface, wherein the sealant layer comprises an ethylene-alpha-olefin;
    an oxygen barrier layer positioned between the heat resistant layer and the sealant layer;
    a first adhesive layer positioned between and in direct contact with each of the heat resistant layer and the oxygen barrier layer; and
    a second adhesive layer positioned between and in direct contact with each of the oxygen barrier layer and the sealant layer;
    wherein the heat resistant layer has a total free shrink value at 90° C. of at least 80%.

14. The food package of claim 13, wherein the package is a cook-in package.

15. The food package of claim 13, wherein the film has a total free shrink of between about 80% and about 120% measured at 90° C.

16. A method of manufacturing a multilayer heat-shrinkable packaging film having an interior surface and an exterior surface, the method comprising the step of co-extruding
    a first outer layer forming at least a portion of the exterior surface, wherein the first outer layer comprises a blend of between about 5% and about 50% by weight of the blend of an amorphous nylon copolymer; between about 5% and about 50% by weight of the blend of a low temperature polyamide having a melting point of less than 155° C.; and between about 5% and about 80% by weight of the blend of a high temperature polyamide having a melting point of at least 155° C.,
    a second layer that is a sealant layer forming at least a portion of the interior surface, wherein the second layer comprises an ethylene-alpha-olefin,
    an oxygen barrier layer positioned between the first outer layer and the second layer,
    a first adhesive layer positioned between and in direct contact with each of the first outer layer and the oxygen barrier layer; and
    a second adhesive layer positioned between and in direct contact with each of the oxygen barrier layer and the second layer;
    wherein the film has a total free shrink value at 90° C. of at least 80%.

* * * * *

UNITED STATES PATENT AND TRADEMARK OFFICE
CERTIFICATE OF CORRECTION

PATENT NO. : 8,741,433 B2
APPLICATION NO. : 11/791901
DATED : June 3, 2014
INVENTOR(S) : Schell et al.

Page 1 of 1

It is certified that error appears in the above-identified patent and that said Letters Patent is hereby corrected as shown below:

In the specification

Column 10, line 16, delete "amorpohous" and insert -- amorphous --.

Column 10, line 18, delete "terephathalamide" and insert -- terephthalamide --.

Column 22, line 37-38, delete "trimethylpropane" and insert -- trimethylolpropane --.

In the claims

Column 35, line 66-67, claim 8, delete "polyimide" and insert -- polyamide --.

Signed and Sealed this
First Day of March, 2016

Michelle K. Lee
*Director of the United States Patent and Trademark Office*